United States Patent
Maeta et al.

(10) Patent No.: US 9,462,250 B2
(45) Date of Patent: Oct. 4, 2016

(54) STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(75) Inventors: Kazushi Maeta, Kyoto (JP); Ryuji Nishikawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 175 days.

(21) Appl. No.: 13/397,998

(22) Filed: Feb. 16, 2012

(65) Prior Publication Data
US 2012/0218266 A1 Aug. 30, 2012

(30) Foreign Application Priority Data

Feb. 24, 2011 (JP) ................................. 2011-039059

(51) Int. Cl.
*H04N 13/02* (2006.01)
*H04N 13/00* (2006.01)
*H04N 13/04* (2006.01)

(52) U.S. Cl.
CPC ........ *H04N 13/0011* (2013.01); *H04N 13/026* (2013.01); *H04N 13/0497* (2013.01); *H04N 2213/003* (2013.01)

(58) Field of Classification Search
CPC .................... H04N 13/0275; A63F 13/5252
USPC .................. 345/419; 715/848–852; 348/42; 382/154, 285; 463/31–33
See application file for complete search history.

(56) References Cited

U.S. PATENT DOCUMENTS

| | | | |
|---|---|---|---|
| 6,798,406 B1 * | 9/2004 | Jones et al. .................... | 345/419 |
| 7,349,568 B2 * | 3/2008 | Takemoto et al. ............ | 382/154 |
| 2003/0043262 A1 | 3/2003 | Takemoto et al. | |
| 2003/0179198 A1 * | 9/2003 | Uchiyama .......... | H04N 13/0404 345/427 |
| 2005/0089212 A1 | 4/2005 | Mashitani et al. | |
| 2007/0236493 A1 * | 10/2007 | Horiuchi ................ | H04N 5/265 345/419 |
| 2009/0284584 A1 | 11/2009 | Wakabayashi et al. | |
| 2011/0018867 A1 | 1/2011 | Shibamiya et al. | |
| 2011/0254915 A1 * | 10/2011 | Vincent et al. ................. | 348/36 |
| 2011/0267348 A1 * | 11/2011 | Lin et al. ...................... | 345/419 |
| 2012/0092364 A1 * | 4/2012 | Chauvin ....................... | 345/619 |

FOREIGN PATENT DOCUMENTS

| | | |
|---|---|---|
| JP | H08-131653 | 5/1996 |
| JP | H11-259686 | 9/1999 |
| JP | 2003-111100 | 4/2003 |
| JP | 2003-348621 | 12/2003 |
| JP | 2004-7395 | 1/2004 |
| JP | 2006-325165 | 11/2006 |
| JP | 2007-260157 | 10/2007 |
| JP | 2011-024638 | 2/2011 |
| JP | 2016-001476 | 1/2016 |
| WO | 2007/116549 | 10/2007 |

* cited by examiner

*Primary Examiner* — Kee M Tung
*Assistant Examiner* — Whitney Pointe
(74) *Attorney, Agent, or Firm* — Nixon & Vanderhye P.C.

(57) ABSTRACT

In a game apparatus, firstly, a depth value in accordance with a state of a virtual three-dimensional space is obtained. Then, an image for left eye and an image for right eye which are obtained by shifting a two-dimensional object that does not exist within the virtual three-dimensional space by a shift amount in accordance with the depth value are synthesized with an image for left eye and an image for right eye which are obtained by capturing the three-dimensional object by a virtual stereo camera, respectively, and the respective synthesized images are rendered, thereby a stereoscopic image is generated. The stereoscopic image obtained as above is outputted to an upper LCD.

23 Claims, 18 Drawing Sheets

STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

The disclosure of Japanese Patent Application No. 2011-039059, filed on Feb. 24, 2011, is incorporated herein by reference.

FIELD

The technology disclosed herein relates to a storage medium having stored therein a display control program, a display control apparatus, a display control system, and a display control method, and more particularly relates to a storage medium having stored therein a display control program to be executed by a computer of a display control apparatus which performs stereoscopic display, a display control apparatus, a display control system, and a display control method.

BACKGROUND AND SUMMARY

In recent years, there have been proposed various apparatuses which perform stereoscopic display in movies, games, and the like. For example, there is an apparatus which takes an image of a virtual three-dimensional space by a virtual stereo camera, generates an image for left eye and an image for right eye, and shifts these images to render the virtual three-dimensional space, thereby stereoscopically displaying three-dimensional objects in the virtual three-dimensional space.

In a conventional apparatus, when a two-dimensional object such as a menu, a subtitle, or an icon which does not exist within a virtual three-dimensional space is stereoscopically displayed together with a three-dimensional object in the virtual three-dimensional space, a rendering process is performed so that the two-dimensional object is displayed always closer to a user in a depth direction than the three-dimensional object because the two-dimensional object has no depth value. Consequently, in the conventional apparatus, it is difficult to represent a two-dimensional object naturally without giving a user a sense of discomfort when the two-dimensional object is stereoscopically displayed together with a three-dimensional object. That is, it is difficult to achieve a visual effect for causing a two-dimensional object that does not exist within a virtual three-dimensional space to be viewed as if it exists in the virtual three-dimensional space.

Therefore, an object of an exemplary embodiment is to provide a storage medium having stored therein a display control program, a display control apparatus, a display control system, and a display control method which can, when a two-dimensional object that is not in a virtual three-dimensional space is stereoscopically displayed together with a three-dimensional object positioned in the virtual three-dimensional space, stereoscopically display the two-dimensional object naturally without giving a user a sense of discomfort.

The storage medium having stored therein the display control program of the exemplary embodiment is a storage medium having stored therein a display control program to be executed by a computer of a display control apparatus which stereoscopically displays a predetermined two-dimensional object on a display device. The display control program causes the computer to execute: obtaining a depth value in accordance with a state of a virtual three-dimensional space captured by a virtual stereo camera; synthesizing an image for left eye and an image for right eye which are obtained by shifting the two-dimensional object, in order to generate parallax, by a shift amount in accordance with the obtained depth value, with an image for left eye and an image for right eye which are obtained by capturing a predetermined three-dimensional object positioned in the virtual three-dimensional space by the virtual stereo camera, respectively, and rendering the respective synthesized images, thereby generating a stereoscopic image; and stereoscopically displaying the generated stereoscopic image on the display device.

According to this configuration, the two-dimensional object is stereoscopically displayed at a depth position in accordance with the state of the virtual three-dimensional space. For example, a two-dimensional object is shifted by a depth value which a three-dimensional object has, thereby the two-dimensional object is stereoscopically displayed at the same depth position as the three-dimensional object. Consequently, when a two-dimensional object that does not exist within a virtual three-dimensional space is stereoscopically displayed together with a three-dimensional object in the virtual three-dimensional space, the two-dimensional object can be stereoscopically displayed naturally without giving a user a sense of discomfort. Examples of the two-dimensional object are a two-dimensional image originally having no depth value, and a two-dimensional image having no depth value, which is obtained by projecting a three-dimensional object using orthogonal projection.

The computer may be further caused to execute setting a parameter, other than the depth value, relating to display of the predetermined two-dimensional object.

According to this configuration, a parameter (e.g. the size or the shape of the two-dimensional object) other than the depth value of the two-dimensional object is set. Consequently, a mode of the two-dimensional object can be changed flexibly without being affected by the state of the virtual three-dimensional space. That is, the size, the shape, and the like of the two-dimensional object can be controlled regardless of (independent from) the depth position at which the two-dimensional object appears to be stereoscopically displayed.

The parameter may be a parameter representing a size of the predetermined two-dimensional object. In this case, the size of the predetermined two-dimensional object can be set without being affected by change in the depth position of the predetermined two-dimensional object.

The parameter representing the size of the predetermined two-dimensional object may be maintained constant. Because only the depth value of the predetermined two-dimensional object is affected by the state of the virtual three-dimensional space, even when the depth position of the predetermined two-dimensional object is changed, the size of the predetermined two-dimensional object can be maintained constant.

A parameter representing a display area of the predetermined two-dimensional object may be set based on a display position of the predetermined three-dimensional object in a two-dimensional coordinate system on a screen of the display device.

According to this configuration, the display area of the predetermined two-dimensional object is determined based on the position, on the screen of the display device, at which the predetermined three-dimensional object is displayed. Consequently, information represented by the predetermined two-dimensional object can be effectively provided to the user.

When it is assumed that the display area of the predetermined two-dimensional object is determined based on the relationship between the predetermined two-dimensional object and the predetermined three-dimensional object in the virtual three-dimensional space which is a three-dimensional coordinate system, because the virtual three-dimensional space is projected using perspective projection by the virtual stereo camera, the size of the display area of the predetermined two-dimensional object may change in accordance with the distance from the virtual stereo camera. On the other hand, according to the above configuration, a display area of the predetermined two-dimensional object is determined based on the display position of the predetermined three-dimensional object on the screen of the display device, that is, the display position of the predetermined three-dimensional object in the two-dimensional coordinate system. Consequently, for example, when the depth value is assigned to the predetermined two-dimensional object so as to be positioned at the same depth position as the predetermined three-dimensional object, the size (width of the display area) of the predetermined two-dimensional object can be prevented from being changed in accordance with the distance between the virtual stereo camera and the predetermined three-dimensional object.

When it is assumed that a virtual screen having a size corresponding to the screen of the display device is positioned between the virtual stereo camera and the predetermined three-dimensional object, the display area of the predetermined two-dimensional object may be determined based on two-dimensional coordinates, on a plane including the virtual screen, at which a line segment that connects a viewpoint position of the virtual stereo camera and the predetermined three-dimensional object intersects with the plane.

According to this configuration, the display area of the predetermined two-dimensional object can be determined easily.

A depth value may be obtained in accordance with a distance between a viewpoint position of the virtual stereo camera and the predetermined three-dimensional object in the virtual three-dimensional space.

According to this configuration, the predetermined two-dimensional object can be stereoscopically displayed in accordance with the depth position of the predetermined three-dimensional object. That is, a predetermined two-dimensional object that does not exist within a virtual three-dimensional space can be represented naturally being positioned at the same depth position as a predetermined object in the virtual three-dimensional space.

A camera-to-camera distance that is a distance between two virtual cameras which configure the virtual stereo camera can be changed in accordance with an operation on the display control apparatus. In this case, a parameter representing a display area of the predetermined two-dimensional object is updated in accordance with the change in the camera-to-camera distance.

The stereoscopic effect of the predetermined three-dimensional object is changed in accordance with the camera-to-camera distance being changed. The shift amount is calculated in accordance with the camera-to-camera distance, and thus the stereoscopic effect of the predetermined two-dimensional object is also changed in the same manner. Consequently, according to the above configuration, the relationship between the stereoscopic effect of the predetermined three-dimensional object and the stereoscopic effect of the predetermined two-dimensional object can be maintained constant.

The computer may be further caused to execute associating the obtained depth value with the predetermined two-dimensional object. In this case, the stereoscopic image is generated by using the associated depth value.

According to this configuration, the obtained depth value is associated with the two-dimensional object, and thus a stereoscopic image can be generated appropriately even when a plurality of two-dimensional objects exist, for example.

Images may be synthesized while the depth value associated with the predetermined two-dimensional object is compared with the depth value of the predetermined three-dimensional object, by using a Z buffer.

According to this configuration, it is possible to easily prevent an image from being stereoscopically displayed in a manner such that the depth values of the respective objects are inconsistent, for example, as in a case of an image in which the two-dimensional object is stereoscopically displayed deeper in the depth direction than the three-dimensional object in the virtual three-dimensional space even though the two-dimensional object is associated with the depth value so as to be stereoscopically displayed closer to the user in the depth direction than the three-dimensional object.

When a Z value of a target object to be rendered is smaller than the Z value of the two-dimensional object or the Z value of the three-dimensional object stored in the Z buffer, the target object is rendered.

According to this configuration, for example, when a target object (a three-dimensional object or a two-dimensional object) is stereoscopically displayed so as to be closer to the user in a depth direction than another object, the target object can be prevent from being stereoscopically displayed farther from the user in the depth direction than the other object.

The predetermined two-dimensional object may be a taken image including a human face captured by an imaging section.

According to this configuration, a visual effect for causing the human face that does not exist within the virtual three-dimensional space to be viewed as if it exists in the virtual three-dimensional space can be exerted.

The predetermined two-dimensional object may be a taken image obtained by an imaging section in real time.

According to this configuration, a display content of the taken image is changed over time. Consequently, a visual effect for causing the two-dimensional object that does not exist within the virtual three-dimensional space to be viewed as if it exists in the virtual three-dimensional space and moves in the virtual three-dimensional space can be easily exerted. The imaging section may be provided in the display control apparatus or may be provided in an external apparatus other than the display control apparatus.

The predetermined two-dimensional object may be obtained by the display control apparatus communicating with an external apparatus.

According to this configuration, a visual effect for causing the two-dimensional object that the display control apparatus does not have, to be viewed as if it exists in the virtual three-dimensional space constructed in the display control apparatus can be obtained.

The exemplary embodiment may be realized as a display control apparatus which stereoscopically displays a predetermined two-dimensional object on a display device. The display control apparatus includes an obtaining unit, a generation unit, and a display control unit. The obtaining unit obtains a depth value in accordance with a state of a virtual three-dimensional space captured by a virtual stereo camera. The generation unit synthesizes an image for left eye and an image for right eye which are obtained by shifting the two-dimensional object, in order to generate parallax, by a shift amount in accordance with the depth value obtained by the obtaining unit, with an image for left eye and an image for right eye which are obtained by capturing a predetermined three-dimensional object positioned in the virtual three-dimensional space by the virtual stereo camera, respectively, and renders the respective synthesized images, thereby generating a stereoscopic image. The display control unit stereoscopically displays the stereoscopic image generated by the generation unit on the display device.

The exemplary embodiment may be realized as a display control system which stereoscopically displays a predetermined two-dimensional object on a display device. The display control system includes an obtaining unit, a generation unit, and a display control unit. The obtaining unit obtains a depth value in accordance with a state of a virtual three-dimensional space captured by a virtual stereo camera. The generation unit synthesizes an image for left eye and an image for right eye which are obtained by shifting the two-dimensional object, in order to generate parallax, by a shift amount in accordance with the depth value obtained by the obtaining unit, with an image for left eye and an image for right eye which are obtained by capturing a predetermined three-dimensional object positioned in the virtual three-dimensional space by the virtual stereo camera, respectively, and renders the respective synthesized images, thereby generating a stereoscopic image. The display control unit stereoscopically displays the stereoscopic image generated by the generation unit on the display device.

The exemplary embodiment may be realized as display control method for stereoscopically displaying a predetermined two-dimensional object on a display device. In the display control method, firstly, a depth value is obtained in accordance with a state of a virtual three-dimensional space captured by a virtual stereo camera. Then, an image for left eye and an image for right eye which are obtained by shifting the two-dimensional object, in order to generate parallax, by a shift amount in accordance with the obtained depth value, are synthesized with an image for left eye and an image for right eye which are obtained by capturing a predetermined three-dimensional object positioned in the virtual three-dimensional space by the virtual stereo camera, respectively, and the respective synthesized images are rendered, thereby a stereoscopic image is generated. The stereoscopic image generated as above is outputted to the display device and stereoscopically displayed.

According to the exemplary embodiment, when a two-dimensional object that does not exist within a virtual three-dimensional space is stereoscopically displayed together with a three-dimensional object in the virtual three-dimensional space, the two-dimensional object can be stereoscopically displayed naturally without giving the user a sense of discomfort.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

Configuration of Game Apparatus 10

Figure 1:
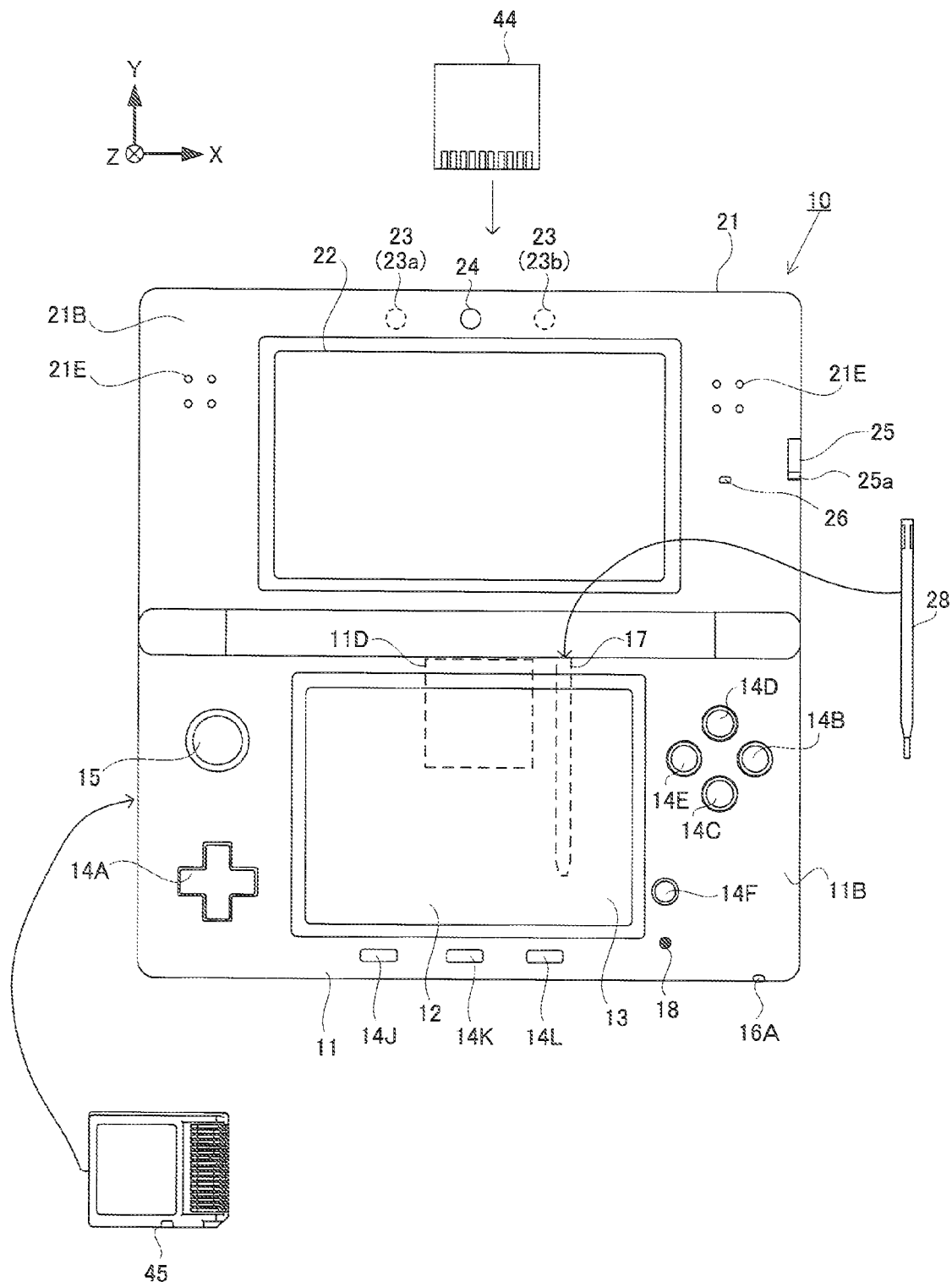
FIG. 1 is a front view of a non-limiting example of a game apparatus 10 in an opened state.

Hereinafter, a game apparatus 10 typifying a display control apparatus according to an exemplary embodiment will be described with reference to drawings as necessary.

The game apparatus 10 is a hand-held game apparatus. As shown in FIG. 1, and FIGS. 2A to 2D, the game apparatus 10 includes a lower housing 11 and an upper housing 21. The lower housing 11 and the upper housing 21 are connected to each other so as to be openable and closable (foldable).

[Description of Lower Housing 11]

As shown in FIG. 1, and FIGS. 2A to 2D, the lower housing 11 is provided with a lower LCD (Liquid Crystal Display) 12, a touch panel 13, operation buttons 14A to 14L, an analog stick 15, an LED 16A and an LED 16B, an insertion opening 17, and a microphone hole 18.

The touch panel 13 is mounted on the screen of the lower LCD 12. The insertion opening 17 (indicated by dashed line in FIG. 1 and FIG. 2D) is provided on the upper side surface of the lower housing 11 for accommodating a touch pen 28.

A cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11.

The analog stick 15 is a device for indicating a direction.

The microphone hole 18 is provided on the inner side surface of the lower housing 11. Under the microphone hole 18, a microphone 42 (see FIG. 3) is provided as a sound input device described below.

Figure 2A:
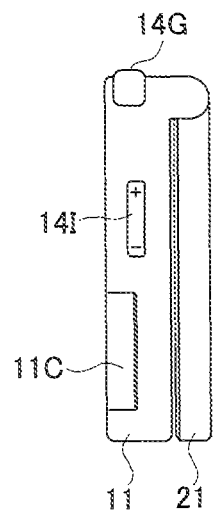
FIG. 2A is a left side view of a non-limiting example of the game apparatus 10 in a closed state.
Figure 2B:
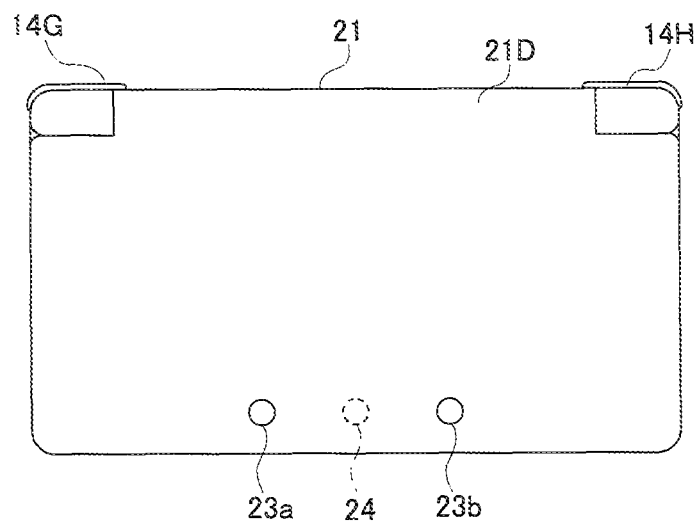
FIG. 2B is a front view of a non-limiting example of the game apparatus 10 in the closed state.
Figure 2C:
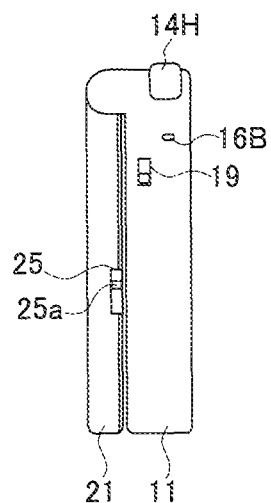
FIG. 2C is a right side view of a non-limiting example of the game apparatus 10 in the closed state.
Figure 2D:
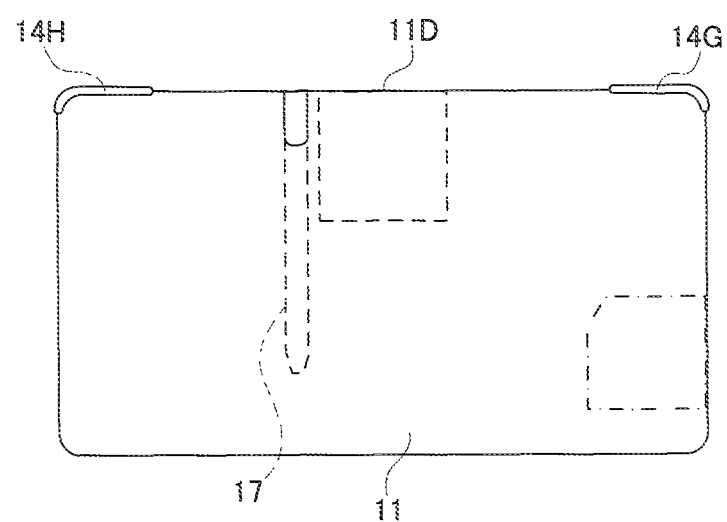
FIG. 2D is a rear view of a non-limiting example of the game apparatus 10 in the closed state.

As shown in FIG. 2B and FIG. 2D, the L button 14G and the R button 14H are provided on the upper side surface of the lower housing 11. As shown in FIG. 2A, a sound volume button 14I is provided on the left side surface of the lower housing 11 for adjusting a sound volume of a speaker 43 (shown in FIG. 3) of the game apparatus 10.

As shown in FIG. 2A, a cover section 11C is provided on the left side surface of the lower housing 11 so as to be openable and closable. Inside the cover section 11C, a connector is provided for electrically connecting between the game apparatus 10 and an external data storage memory 45.

As shown in FIG. 2D, an insertion opening 11D through which an external memory 44 is inserted is provided on the upper side surface of the lower housing 11.

As shown in FIG. 1 and FIG. 2C, a first LED 16A for notifying a user of an ON/OFF state of a power supply of the game apparatus 10 is provided on the lower side surface of the lower housing 11. A second LED 16B for notifying a user of an establishment state of a wireless communication of the game apparatus 10 is provided on the right side surface of the lower housing 11. The game apparatus 10 can make wireless communication with other devices, and a wireless switch 19 for enabling/disabling the function of the wireless communication is provided on the right side surface of the lower housing 11 (see FIG. 2C).

[Description of Upper Housing 21]

As shown in FIG. 1 and FIG. 2, the upper housing 21 is provided with an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26.

The upper LCD 22 is a display device capable of displaying a stereoscopically viewable image. Specifically, the upper LCD 22 is a display device which allows a user to view a stereoscopic image with her/his naked eyes by utilizing parallax barrier. The upper LCD 22 allows a user to view an image for a left eye with her/his left eye, and an image for a right eye with her/his right eye by utilizing a parallax barrier, so that a stereoscopic image (stereoscopically viewable image) exerting a stereoscopic effect for a user can be displayed. Further, the upper LCD 22 may disable the parallax barrier. When the parallax barrier is disabled, an image can be displayed in a planar manner. Thus, the upper LCD 22 is a display device capable of switching between a stereoscopic display mode for displaying a stereoscopically viewable image and a planar display mode for displaying an image in a planar manner (for displaying a planar view image). The switching of the display mode is performed by means of, for example, the 3D adjustment switch 25 described below.

Two imaging sections (23a and 23b) provided on the outer side surface 21D of the upper housing 21 are generically referred to as the outer imaging section 23. The outer imaging section (left) 23a and the outer imaging section (right) 23b can be used as a stereo camera according to a program executed by the game apparatus 10.

The inner imaging section 24 is positioned on the inner side surface 21B of the upper housing 21, and acts as an imaging section which has an imaging direction which is the same direction as the inward normal direction of the inner side surface. By means of the inner imaging section 24, an image of a face of a player who is operating the game apparatus 10 can be captured.

The 3D adjustment switch 25 is a slide switch, and is used for switching a display mode of the upper LCD 22 as described above. The 3D adjustment switch 25 is used for adjusting the stereoscopic effect of a stereoscopically viewable image (stereoscopic image) which is displayed on the upper LCD 22. A slider 25a of the 3D adjustment switch 25 can be slid to any position in a predetermined direction (upward/downward direction), and a display mode of the upper LCD 22 is determined according to the position of the slider 25a. Further, the viewable manner for the stereoscopic image is adjusted according to the position of the slider 25a.

The 3D indicator 26 is implemented as LEDs for indicating whether the upper LCD 22 is in the stereoscopic display mode.

Further, a speaker hole 21E is provided on the inner side surface of the upper housing 21. Sound is outputted through the speaker hole 21E from the speaker 43 described below.

[Internal Configuration of Game Apparatus 10]

Figure 3:
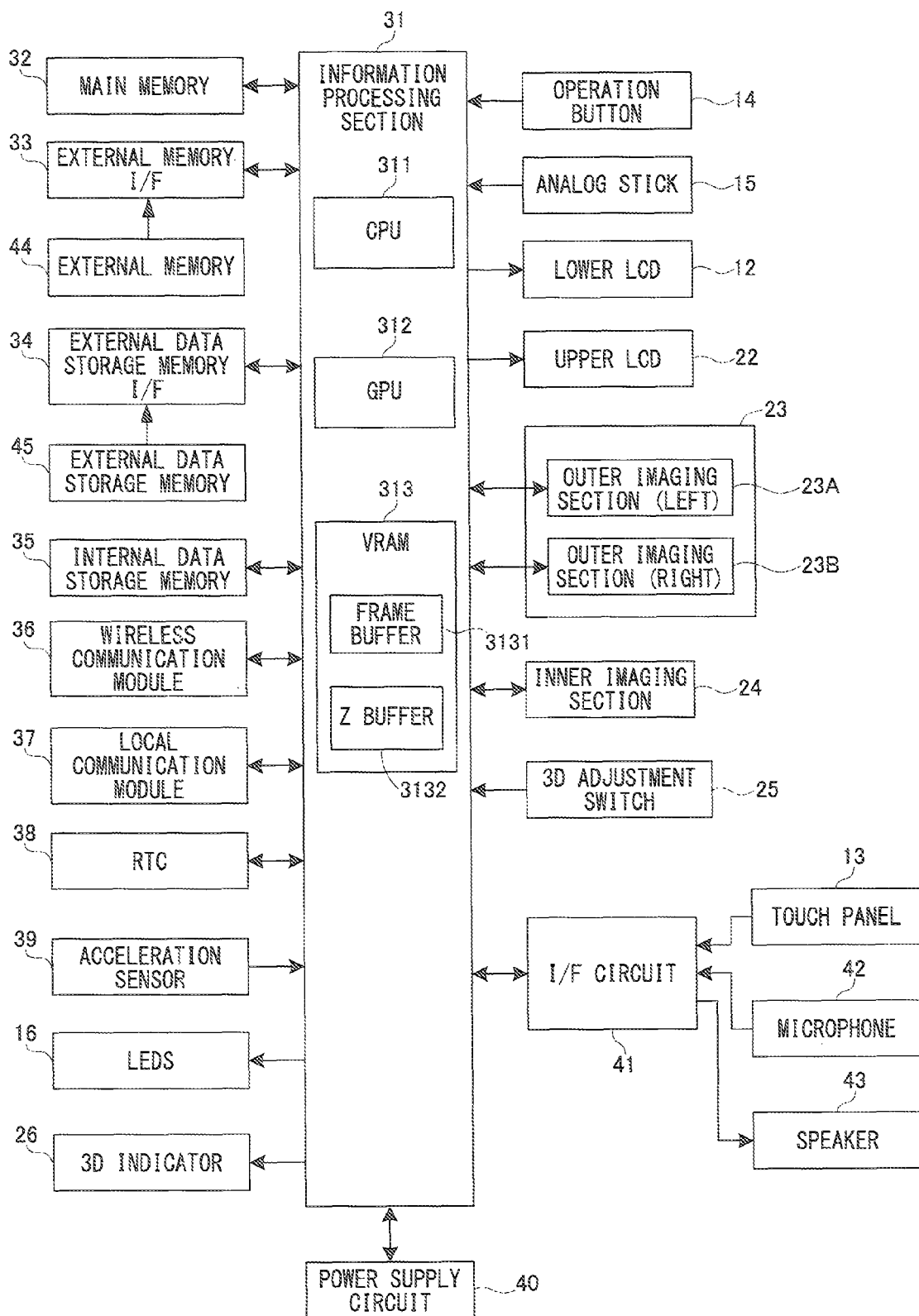
FIG. 3 is a block diagram illustrating a non-limiting example of an internal configuration of the game apparatus 10.

Next, an internal electrical configuration of the game apparatus 10 will be described with reference to FIG. 3. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41, and the like.

The information processing section 31 includes: a CPU (Central Processing Unit) 311 for executing a predetermined program; a GPU (Graphics Processing Unit) 312 for performing image processing; and a VRAM (Video RAM) 313. The CPU 311 executes a program stored in a memory (for example, the external memory 44 connected to the external memory I/F 33, or the internal data storage memory 35) in the game apparatus 10, to execute a process based on the program. The program executed by the CPU 311 may be obtained from another device through communication with the other device.

The GPU 312 generates an image in accordance with a graphics command (image drawing command) from the CPU 311. Specifically, in accordance with a graphics command, the GPU 312 performs a rendering process including a calculation process necessary for stereoscopically displaying a three-dimensional object positioned in a virtual three-dimensional space and a two-dimensional object not positioned within the virtual three-dimensional space, thereby generating a stereoscopic image (an image for left eye and an image for right eye). The process performed by the CPU 311 and the GPU 312 in order to generate the stereoscopic image will be described later in detail.

The VRAM 313 stores data (e.g. polygon data, texture data) necessary for executing a graphics command and includes a frame buffer 3131 and a Z buffer 3132. The frame buffer 3131 is a two-dimensional structure memory for storing information (color and brightness) for one frame provided to each pixel of the upper LCD 22, having an area for storing an image for left eye and an area for storing an image for right eye. The data of the image for left eye and the image for right eye stored in the frame buffer 3131 are outputted to the upper LCD 22 and thereby a stereoscopic image is displayed on the upper LCD 22. The information stored in the frame buffer 3131 are rewritten every frame by the GPU 312.

The Z buffer 3132 stores a depth value (hereinafter, referred to as a Z value) which is depth information of a pixel corresponding to each memory position of the frame buffer 3131. The Z buffer 3132 has a storage area corresponding to (the number of pixels corresponding to the frame buffer 3131)×(the bit count of a Z value per pixel).

The external memory I/F 33 is an interface for detachably connecting to the external memory 44. The external data storage memory I/F 34 is an interface for detachably connecting to the external data storage memory 45.

The main memory 32 is volatile storage device used as a work area and a buffer area for (the CPU 311 of) the information processing section 31.

The external memory 44 is non-volatile storage device for storing, for example, a program executed by the information processing section 31. The external memory 44 is implemented as, for example, a read-only semiconductor memory.

The external data storage memory 45 is implemented as a non-volatile readable and writable memory (for example, a NAND flash memory), and is used for storing any data.

The internal data storage memory 35 is implemented as a non-volatile readable and writable memory (for example, a NAND flash memory), and is used for storing predetermined data. For example, data and/or programs downloaded through the wireless communication module 36 by wireless communication are stored in the internal data storage memory 35.

The wireless communication module 36 has a function of connecting to a wireless LAN by using a method compliant with, for example, IEEE 802.11.b/g standard. The local communication module 37 has a function of performing wireless communication with the same type of game apparatus in a predetermined communication method (for example, a communication based on an independent protocol, or infrared communication).

The acceleration sensor 39 detects magnitudes of accelerations (linear accelerations) in the directions of the straight lines along the three axial (xyz axial) directions, respectively. The information processing section 31 can receive data (acceleration data) representing accelerations detected by the acceleration sensor 39, and detect an orientation and a motion of the game apparatus 10.

The RTC 38 counts time and outputs the counted time to the information processing section 31. The information processing section 31 calculates a current time (date) based on the time counted by the RTC 38. The power supply circuit 40 controls power to be supplied from a power supply (the rechargeable battery) of the game apparatus 10, and supplies power to each component of the game apparatus 10.

The touch panel 13, the microphone 42, and the speaker 43 are connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The information processing section 31 obtains the touch position data to recognize a position at which an input on the touch panel 13 is made.

The operation button 14 includes the operation buttons 14A to 14L described above. Operation data representing an input state of each of the operation buttons 14A to 14I is outputted from the operation button 14 to the information processing section 31, and the input state indicates whether or not each of the operation buttons 14A to 14I has been pressed.

The lower LCD 12 and the upper LCD 22 are connected to the information processing section 31. Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, which are stored in the VRAM 313 of the information processing section 31, are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the right-eye images and the left-eye images each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the right-eye image is viewed by the user's right eye, and the left-eye image is viewed by the user's left eye. Thus, the stereoscopically viewable image is displayed on the screen of the upper LCD 22.

The outer imaging section 23 and the inner imaging section 24 each take an image according to an instruction from the information processing section 31, and data of the taken images are outputted to the information processing section 31.

The 3D adjustment switch 25 transmits, to the information processing section 31, an electrical signal based on the position of the slider 25a.

The information processing section 31 controls whether or not the 3D indicator 26 is to be lit up. For example, the information processing section 31 lights up the 3D indicator 26 when the upper LCD 22 is in the stereoscopic display mode.

The configuration of the hardware described above is only an exemplary configuration. The configuration of the game apparatus 10 may be modified as necessary.

[Outline of Game]

Next, an outline of a shooting game that progresses as the CPU 311 of the game apparatus 10 executes a game program (display control program) will be described.

Figure 4:
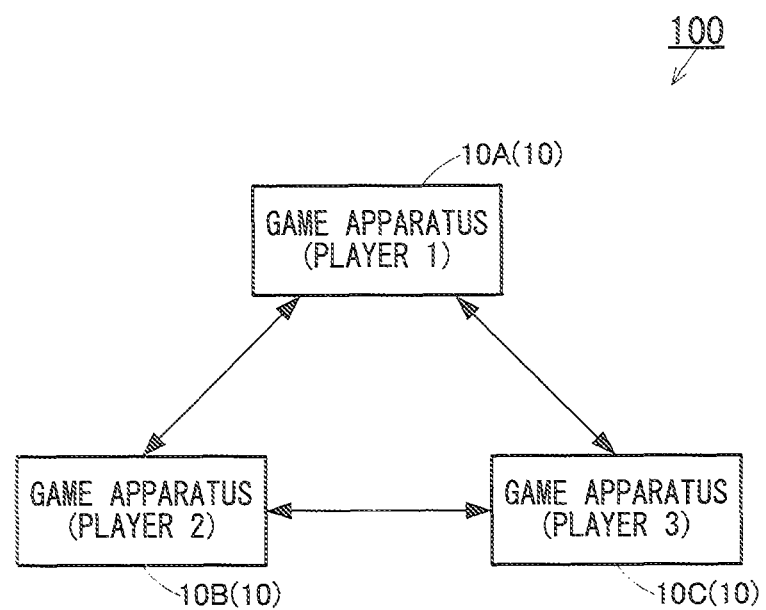
FIG. 4 is a diagram illustrating a non-limiting example of a game system 100.
Figure 5:
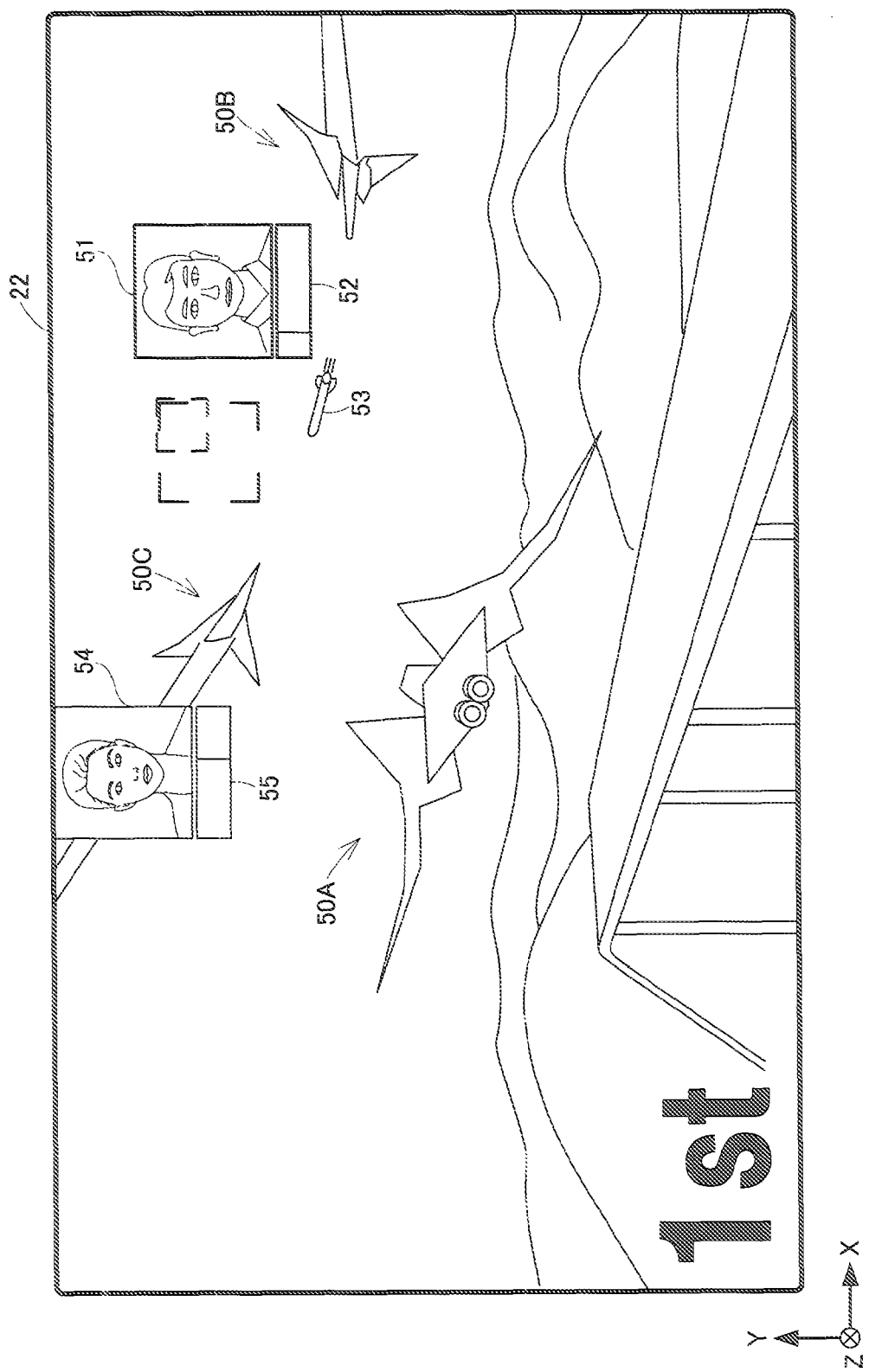
FIG. 5 is a screen diagram illustrating a non-limiting example of an image stereoscopically displayed on an upper LCD 22.

FIG. 4 is a diagram illustrating a game system 100 constituted by three game apparatuses 10 (10A, 10B, and 10C). FIG. 5 is a screen diagram illustrating an example of an image stereoscopically displayed on the upper LCD 22.

As shown in FIG. 4 and FIG. 5, the shooting game illustrated in the exemplary embodiment is a multiplayer-type shooting game in which a player 1 operating the game apparatus 10A, a player 2 operating the game apparatus 10B, and a player 3 operating the game apparatus 10C fight against each other. In the exemplary embodiment, a case is taken as an example, in which three players 1 to 3 play a multiplayer game. However, the number of players who participate in the multiplayer game can be changed as appropriate. Further, the exemplary embodiment is also applicable to single play games. In the following, the shooting game in the exemplary embodiment will be described with reference to images to be displayed on the game apparatus 10A.

FIG. 5 illustrates an example of an image which is stereoscopically displayed on the upper LCD 22 of the game apparatus 10A operated by the player 1. As shown in FIG. 5, an image of a flying own aircraft 50A operated by the player 1 seen from a behind viewpoint (third person viewpoint) located behind the own aircraft 50A is stereoscopically displayed. In the example shown in FIG. 5, in addition to the own aircraft 50A, three-dimensional objects such as an enemy aircraft 50B, an enemy aircraft 50C, and a missile 53 are displayed.

Figure 6:
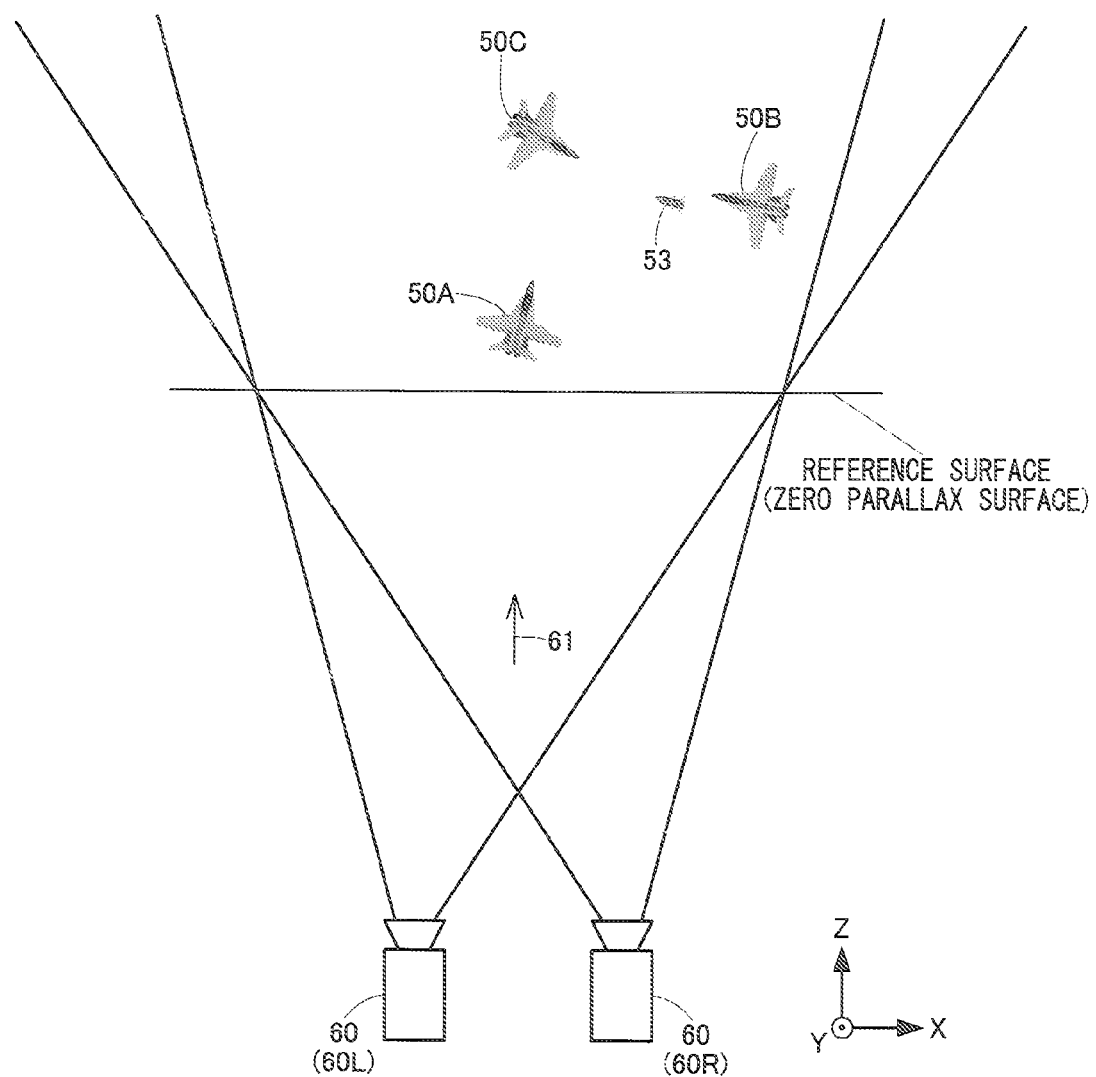
FIG. 6 is a schematic view of a non-limiting example of a virtual three-dimensional space.

FIG. 6 is a schematic view of a virtual three-dimensional space structured in the game apparatus 10A. As shown in FIG. 6, the own aircraft 50A, the enemy aircraft 50B, the enemy aircraft 50C, the missile 53, and a virtual stereo camera 60 (a camera for left eye 60L and a camera for right eye 60R) are positioned in the virtual three-dimensional space. The own aircraft 50A is a player object that moves in the virtual three-dimensional space in accordance with an operation performed by the player 1 on the game apparatus 10A. The enemy aircraft 50B is a player object that moves in the virtual three-dimensional space in accordance with an operation performed by the player 2 on the game apparatus 10B. The enemy aircraft 50C is a player object that moves in the virtual three-dimensional space in accordance with an operation performed by the player 3 on the game apparatus 10C. The missile 53 is a missile launched from the enemy aircraft 50B and is a so-called non-player object.

Camera parameters such as an imaging direction 61, a viewpoint position, a viewing angle (angle of view), position coordinates, a movement speed of the virtual stereo camera 60 are controlled so that the virtual stereo camera 60 gazes the own aircraft 50A while keeping a substantially constant distance from the own aircraft 50A. Accordingly, an image of a virtual three-dimensional space when the own aircraft 50A is seen from viewpoint of the virtual stereo camera 60 is stereoscopically displayed on the upper LCD 22 of the game apparatus 10A. As shown in FIG. 5, the own aircraft 50A is gazed by the virtual stereo camera 60 and thus displayed on the center of the screen of the upper LCD 22.

As shown in FIG. 6, a reference surface (zero parallax surface) is set for a virtual three-dimensional space captured by the virtual stereo camera 60. Here, the reference surface is at a position where no parallax is generated in a stereoscopic image when a virtual three-dimensional space is captured by the virtual stereo camera 60. In other words, the reference surface is a surface where an imaging range of the camera for left eye 60L coincides with an imaging range of the camera for right eye 60R. In the game apparatus 10, a control is performed so that the reference surface is positioned on the screen of the upper LCD 22. Consequently, an object positioned on the reference surface is reproduced on the screen of the upper LCD 22. That is, when the object is stereoscopically displayed, the object is viewed as if it is on the screen of the upper LCD 22. Meanwhile, an object positioned closer to the user than the reference surface when seen from the virtual stereo camera 60, is reproduced at a position closer to the user than the screen of the upper LCD 22. That is, when the object is stereoscopically displayed, the object is viewed as if it is projecting in front of the screen of the upper LCD 22. An object positioned deeper in a depth direction than the reference surface is reproduced at a position deeper in the depth direction than the screen of the upper LCD 22. That is, when the object is stereoscopically displayed, the object is viewed as if it is positioned deeper in the depth direction that the screen of the upper LCD 22.

In the virtual three-dimensional space, in addition to these objects, landform objects such as mountains and a railroad bridge (see FIG. 5) exist. However, these objects are omitted in the schematic views illustrating the virtual three-dimensional space in FIG. 6 and subsequent drawings. In the exemplary embodiment, a case where the shooting game is executed based on the display control program is described. However, the exemplary embodiment is also applicable to other games such as an action game if they require stereoscopically displaying an image which is obtained by capturing three-dimensional objects in a virtual three-dimensional space by virtual stereo cameras.

On the upper LCD 22 of the game apparatus 10A, two-dimensional objects, which do not exist within the virtual three-dimensional space, such as the taken image 51, a life gauge 52, a taken image 54, and a life gauge 55 are further displayed. The taken image 51 represents a face of the player 2 obtained by capturing the face of the player 2 operating the enemy aircraft 50B by an inner imaging section 24 of the game apparatus 10B, and the game apparatus 10A obtains the taken image 51 through communication with the game apparatus 10B. The taken image 51 represents the face of the player 2 operating the enemy aircraft 50B and thus is displayed adjacent to the enemy aircraft 50B. The taken image 54 represents a face of the player 3 obtained by capturing the face of the player 3 operating the enemy aircraft 50C by the inner imaging section 24 of the game apparatus 10C, and the game apparatus 10A obtains the taken image 54 through communication with the game apparatus 10C. The taken image 54 represents the face of the player 3 operating the enemy aircraft 50C, and thus is displayed adjacent to the enemy aircraft 50C. Accordingly, by viewing the image stereoscopically displayed on the upper LCD 22, the player 1 of the game apparatus 10A can easily recognize that the player 2 is operating the enemy aircraft 50B and the player 3 is operating the enemy aircraft 50C.

The player 1 of the game apparatus 10A can change a flight direction of the own aircraft 50A by operating the cross button 14A. Further, the player 1 can cause the own aircraft 50A to launch a missile by pressing the button 14B to attack the enemy aircraft 50B or the enemy aircraft 50C, for example. The life gauge 52 indicates an amount of energy of the enemy aircraft 50B. When the enemy aircraft 50B is attacked by a missile launched from the own aircraft 50A or the enemy aircraft 50C, its energy is decreased. As the amount of energy indicated by the life gauge 52 is decreased to zero, the game of the player 2 is over. The same applies to the life gauge 55. In the state shown in FIG. 5, the amount of energy (not shown) of the own aircraft 50A is the greatest, and thus the characters "1st" indicating that the player 1 wins first place are displayed on the lower left of the upper LCD 22.

In the following, the configuration of the game apparatus 10 necessary for performing such a shooting game, and processing performed by the game apparatus 10 will be described in detail, taking a case where the game apparatus 10 is the game apparatus 10A as an example.

[Main Data]

Figure 7:
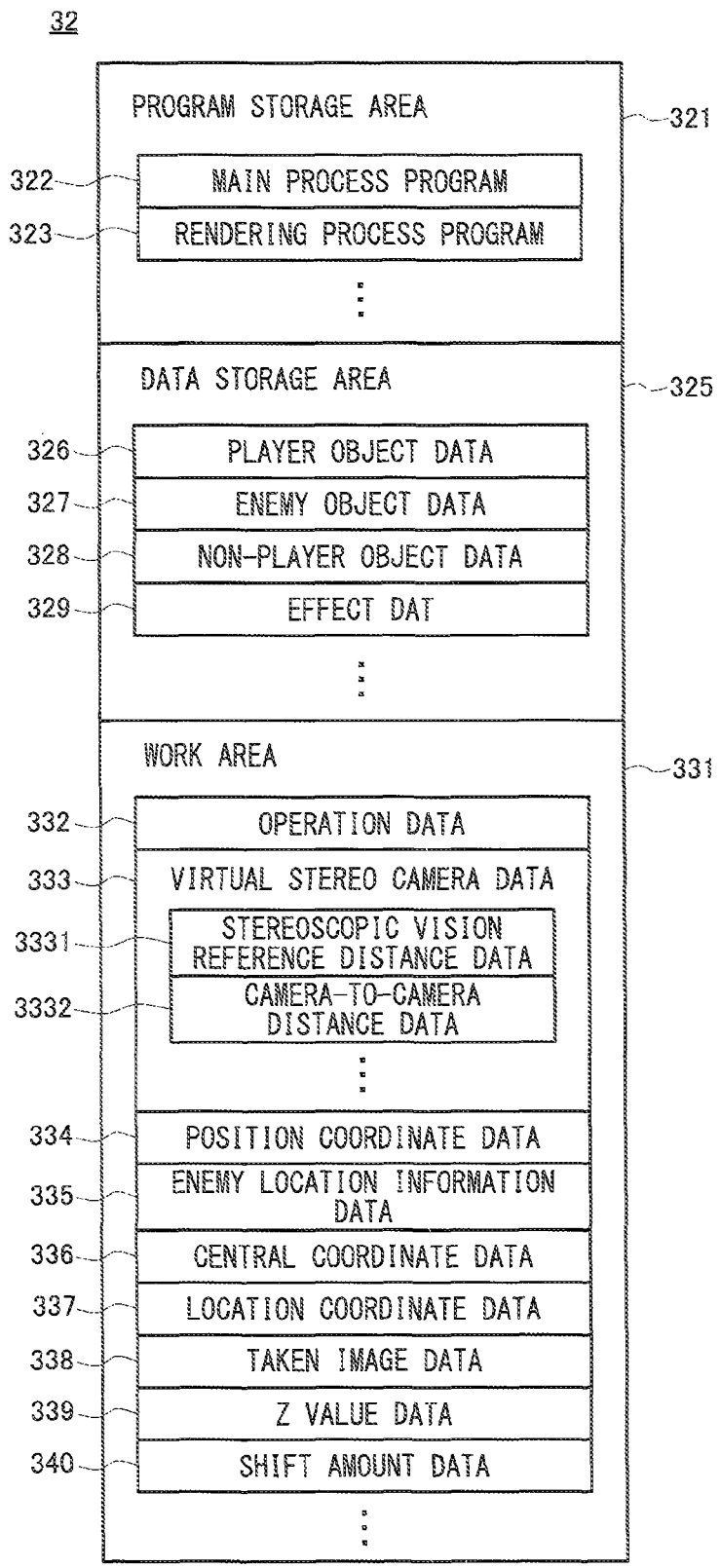
FIG. 7 is a diagram illustrating a non-limiting example of a memory configuration of a main memory 32.

FIG. 7 is a diagram illustrating an example of a memory configuration of the main memory 32. As illustrated in FIG. 7, the main memory 32 includes a program storage area 321, a data storage area 325, and a work area 331. In the program storage area 321, game programs (display control programs) to be executed by the information processing section 31 are stored. In the data storage area 325, data necessary for rendering various three-dimensional objects in the virtual three-dimensional space are stored. The data in the program storage area 321 and data in the data storage area 325 are previously stored in the external memory 44 and are loaded into the main memory 32 from the external memory 44 at the time of the game process.

In the program storage area 321, a main process program 322, a rendering process program 323, and the like are stored. The main process program 322 is a program for causing the information processing section 31 to execute the later described main process shown in FIG. 8. The rendering process program 323 is a program for causing the information processing section 31 to execute the later described rendering process shown in FIG. 10 and FIG. 11.

In the data storage area 325, player object data 326, enemy object data 327, non-player object data 328, effect data 329, and the like are stored.

The player object data 326 is data regarding the own aircraft 50A which is a player object in the game apparatus 10A, containing modeling data, texture data (RGB value), and the like of the own aircraft 50A. The enemy object data 327 is data regarding player objects (here, the enemy aircraft 50B and the enemy aircraft 50C) which are enemies of the own aircraft 50A, containing modeling data, texture data (RGB value), and the like of the enemy aircraft 50B and the enemy aircraft 50C. The non-player object data 328 is data regarding non-player objects such as the missile 53 and landforms in the virtual three-dimensional space, containing modeling data, texture data (RGB value), and the like of the non-player objects. The effect data 329 is image data used for expressing various effects that are used during a game play. An example of the effect data 329 is image data representing, for example, the missile 53 hitting the enemy aircraft 50C.

The work area 331 is a storage area for temporarily storing data generated in the game process. The work area 331 stores operation data 332, virtual stereo camera data 333, position coordinate data 334, enemy location information data 335, central coordinate data 336, location coordinate data 337, taken image data 338, Z value data 339, shift amount data 340, and the like.

The operation data 332 is data representing an operation performed by a player on the touch panel 13, the operation button 14, the analog stick 15, and the 3D adjustment switch 25.

The virtual stereo camera data 333 is data representing camera parameters which are parameters of the virtual stereo camera 60. The virtual stereo camera data 333 is data representing camera parameters such as the imaging direction 61, the viewpoint position, the viewing angle, the position coordinates, and the movement speed of the virtual stereo camera 60, including stereoscopic vision reference distance data 3331 and camera-to-camera distance data 3332. Here, the stereoscopic vision reference distance data 3331 is data representing a stereoscopic vision reference distance D (see FIG. 16) which is a distance between the viewpoint position of the virtual stereo camera 60 and the reference surface in the imaging direction 61. The camera-to-camera distance data 3332 is data representing a camera-to-camera distance E (i.e. a base-line length: see FIG. 16) which is a distance between the viewpoint positions of the camera for left eye 60L and the camera for right eye 60R, which configure the virtual stereo camera 60. In the game apparatus 10, when the 3D adjustment switch 25 is operated, the camera-to-camera distance data 3332 is updated by the CPU 311 so that the camera-to-camera distance E represented by the camera-to-camera distance data 3332 is in accordance with the operation on the 3D adjustment switch 25.

The position coordinate data 334 is data representing position coordinates (X, Y, Z) of the own aircraft 50A in the virtual three-dimensional space. The enemy location information data 335 is data representing position coordinates (X, Y, Z) of the enemy aircraft 50B and the enemy aircraft 50C in the virtual three-dimensional space. Here, the enemy aircraft 50B is operated by the player 2 of the game apparatus 10B, and the enemy aircraft 50C is operated by the player 3 of the game apparatus 10C. Accordingly, the game apparatus 10A obtains the enemy location information data 335 through communication with the game apparatus 10B and the game apparatus 10C. The enemy location information data 335 is updated as appropriate every time the game apparatus 10A obtains the enemy location information data through communication with the game apparatus 10B and the game apparatus 10C.

The central coordinate data 336 is data representing central coordinates (two-dimensional coordinates) of the enemy aircraft 50B and central coordinates (two-dimensional coordinates) of the enemy aircraft 50C on a plane including the screen of the upper LCD 22. The central coordinates herein will be described later in detail taking the central coordinates (X1, Y1) of the enemy aircraft 50B as an example with reference to FIG. 12.

The location coordinate data 337 data representing positions (two-dimensional coordinates), on the screen of the upper LCD 22, at which the taken images 51, 54 are positioned. As shown in FIG. 5, the taken images 51, 54 are displayed respectively at positions adjacent to the enemy aircrafts 50B, 50C. Consequently, locations of the taken images 51, 54 are determined based on the central coordinates of the enemy aircrafts 50B, 50C represented by the central coordinate data 336. Details will be described later based on FIGS. 13 to 15. The locations of the taken images 51, 54 represented by the location coordinate data 337 are not positions, on the screen, at which the image for left eye and the image for right eye of each of the taken images 51, 54 are displayed, but are positions based on which the display areas for displaying the image for left eye and the image for right eye of each of the taken images 51, 54 are determined.

In the exemplary embodiment, the taken image data 338 represents image data of the taken image 51 and image data of the taken image 54. The image data of the taken image 51 is obtained in the imaging process by the inner imaging section 24 of the game apparatus 10B, and the image data of the taken image 54 is obtained in the imaging process by the inner imaging section 24 of the game apparatus 10C. That is, the taken image data 338 is obtained by the game apparatus 10A through communication with the game apparatus 10B and the game apparatus 10C. Consequently, the taken image data 338 is updated as appropriate every time the game apparatus 10A obtains the taken image data through communication with the game apparatus 10B and the game apparatus 10C in the same manner as the case of the enemy location information data 335.

The Z value data 339 is data representing a Z value associated with a two-dimensional object that does not exist within the virtual three-dimensional space, having no depth value (Z value). In the exemplary embodiment, the Z value data 339 is data representing a Z value of the taken image 51 and a Z value of the taken image 54. By associating the taken image 51 and the taken image 54 that have no Z value with Z values, respectively, the taken image 51 and the taken image 54 that are two-dimensional objects can be assigned with a stereoscopic effect. A process of associating a two-dimensional object with a Z value will be described later in detail based on the flowchart of FIG. 10.

The shift amount data 340 is data representing a shift amount of the image for left eye and image for right eye of the taken image 51 displayed on the upper LCD 22 and a shift amount of the image for left eye and the image for right eye of the taken image 54. By changing the shift amount, the stereoscopic effect of a two-dimensional object stereoscopically displayed on the upper LCD 22 is changed. A method of calculating the shift amount represented by the shift amount data 340 will described later in detail taking a case of calculating a shift amount P of the image for left eye and the image for right eye of the taken image 51 as an example with reference to FIG. 16. The shift amount represented by the shift amount data 340 is changed under the influence of the camera-to-camera distance E (see FIG. 16), and thus changed by an operation on the 3D adjustment switch 25 performed by the player. That is, the player can change the stereoscopic effect of a two-dimensional object (and a three-dimensional object) stereoscopically displayed on the upper LCD 22 by operating the 3D adjustment switch 25.

A part of or all of the main data described above may be stored by the external data storage memory 45 instead of the main memory 32.

[Main Process]

Figure 8:
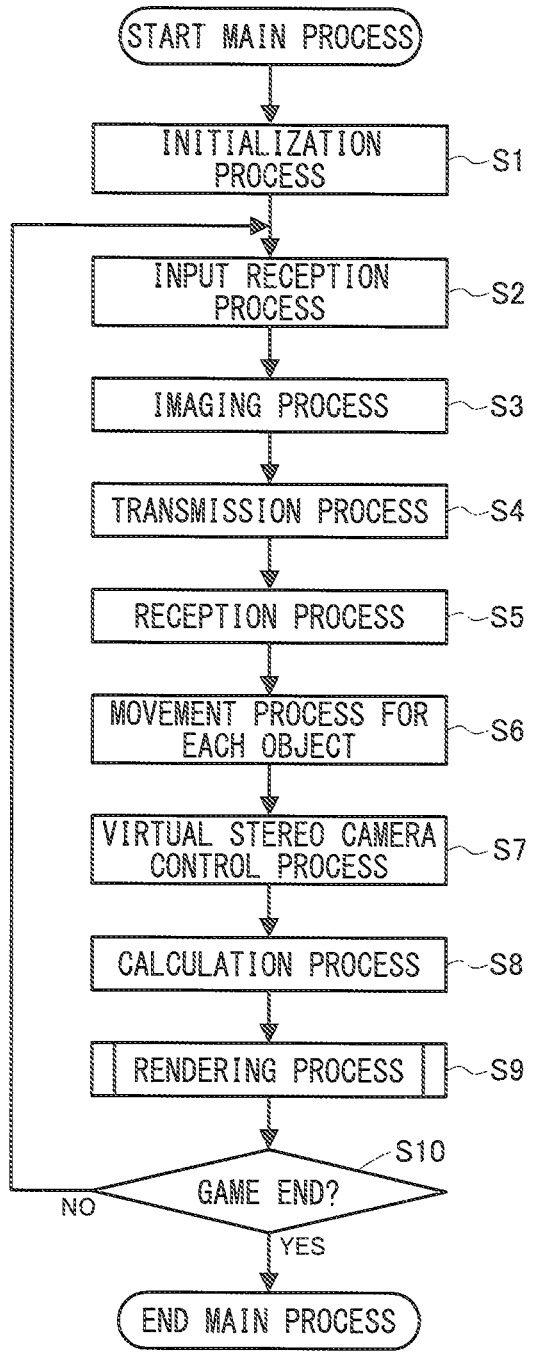
FIG. 8 is a flowchart illustrating a non-limiting example of a main process executed by the game apparatus 10.

Next, the main process executed by the game apparatus 10 will be described taking a case where the game apparatus 10 is the game apparatus 10A as an example with reference to FIG. 8. FIG. 8 is a flowchart illustrating an example of the main process executed by the game apparatus 10.

Firstly, the CPU 311 executes an initialization process for initializing data to be used in subsequent processes (step S1). Specifically, the CPU 311 initializes various variables, flags, and the like in the work area 331 to be used in the subsequent processes. Then, the CPU 311 positions the own aircraft 50A, the enemy aircraft 50B, the enemy aircraft 50C, and non-player objects (e.g. landform objects) in a virtual three-dimensional space. Specifically, the CPU 311 stores data representing an initial position of the virtual stereo camera 60 and initial states of various objects at the time of start of the game in the work area 331. Consequently, the virtual three-dimensional space is constructed and a stereoscopic image captured by the virtual stereo camera 60 is displayed on the upper LCD 22. That is, the CPU 311 constructs a virtual three-dimensional space and positions each object in the virtual three-dimensional space in accordance with data representing the initial state of the object. Then, the CPU 311 causes the GPU 312 to generate a stereoscopic image (an image for left eye and an image for right eye) which is a virtual three-dimensional space seen from the viewpoint of the virtual stereo camera 60 and causes the stereoscopic image to be displayed on the upper LCD 22. Subsequently, a loop of processes at steps S2 to S10 is repeatedly performed, once in each frame (e.g. 1/60 sec). Accordingly, the game advances.

Subsequent to the initialization process at step S1, the CPU 311 receives an input of operation information from the touch panel 13, the operation button 14, the analog stick 15, or the 3D adjustment switch 25 (step S2). Specifically, operation data representing an input state of the touch panel 13, the operation button 14, the analog stick 15, or the 3D adjustment switch 25 is inputted to the information processing section 31, and the CPU 311 stores the operation data in the work area 331 as the operation data 332. When new operation data 332 is stored, old operation data 332 is rewritten to the new operation data 332, and thereby the operation data 332 is updated as appropriate.

Next, the CPU 311 executes an imaging process (step S3). Specifically, the CPU 311 obtains a camera image (inner camera image) captured in real time by the inner imaging section 24 of the game apparatus 10A and stores the camera image in the work area 331. The process at step S3 is performed and thereby an image data that includes a face of the player (player 1) of the game apparatus 10A as a photographic subject is obtained. The camera image is transmitted to the game apparatus 10A and the game apparatus 10B as taken image data.

An imaging process similar to the imaging process described above is performed in the game apparatus 10B and the game apparatus 10C. Taken image data of the taken images 51, 54 obtained in these imaging processes are provided to the game apparatus 10A in a reception process at step S5 described later. Consequently, in the game apparatus 10A, the taken images 51, 54 obtained in real time in the game apparatus 10B and the game apparatus 10C are stereoscopically displayed. Thus, the player of the game apparatus 10A can enjoy a game while observing change in the faces of the players 2, 3 represented by the stereoscopically displayed taken images 51, 54.

Subsequently, the CPU 311 performs a transmission process (step S4) of transmitting, to the game apparatus 10B and the game apparatus 10C, data necessary for the game process in the game apparatus 10B and the game apparatus 10C. Meanwhile, the CPU 311 performs a reception process (step S5) of receiving, from the game apparatus 10B and the game apparatus 10C, data necessary for the game process in itself (i.e. the game apparatus 10A). The transmission process at step S4 and the reception process at step S5 are performed by using the wireless communication module 36.

Figure 9:
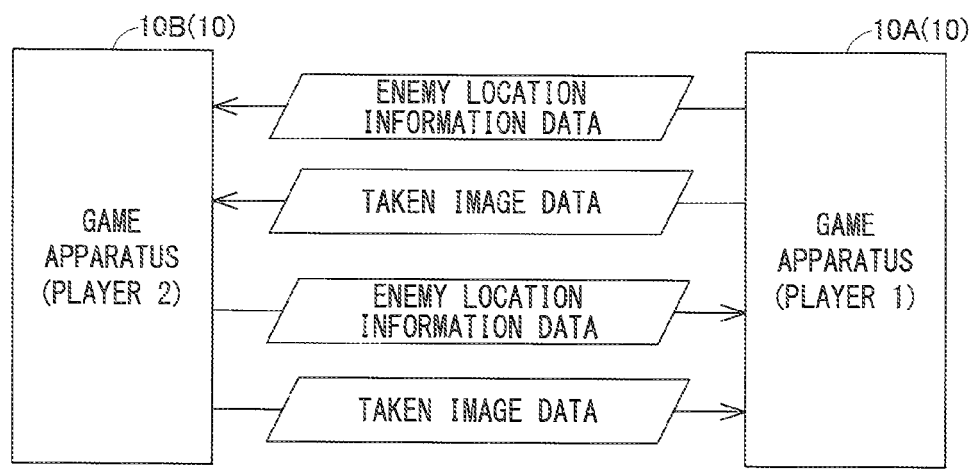
FIG. 9 is a diagram illustrating a non-limiting example of data that are transmitted and received between a game apparatus 10A and a game apparatus 10B.

FIG. 9 is a diagram illustrating data transmitted/received between the game apparatus 10A and the game apparatus 10B. When the transmission process at step S4 is performed, the enemy location information data and the taken image data are transmitted from the game apparatus 10A to the game apparatus 10B as shown in FIG. 9. Here, the enemy location information data is data representing position coordinates of the own aircraft 50A in the virtual three-dimensional space and the taken image data is data of the camera image representing the face of the player (player 1) of the game apparatus 10A which is obtained in the imaging process at step S3. By the enemy location information data and the taken image data transmitted to the game apparatus 10B, an aircraft (here, the own aircraft 50A) can be stereoscopically displayed as an enemy aircraft at an appropriate position on the upper LCD 22 of the game apparatus 10B together with the face of the player 1 operating the aircraft.

When the reception process at step S5 is performed, the enemy location information data and the taken image data transmitted from the game apparatus 10B are received by the game apparatus 10A as shown in FIG. 9. Here, the enemy location information data is data representing position coordinates of the enemy aircraft 50B in the virtual three-dimensional space and the taken image data is image data representing the face of the player (player 2) of the game apparatus 10B which is obtained in the imaging process by the inner imaging section 24 of the game apparatus 10B. That is, the taken image data is image data obtained through orthogonal projection by using the inner imaging section 24 that is a real camera. The enemy location information data and the taken image data received through the reception process at step S5 are stored as the enemy location information data 335 and the taken image data 338, respectively in the work area 331. Consequently, the enemy location information data 335 and the taken image data 338 are updated as appropriate every time the reception process at step S5 is performed. Accordingly, the enemy location information data 335 and the taken image data 338 are updated as appropriate and thereby the enemy aircraft 50B can be stereoscopically displayed at an appropriate position of the upper LCD 22 of the game apparatus 10A together with the face of the player 2 operating the enemy aircraft 50B.

Here, an example in which data are transmitted/received between the game apparatus 10A and the game apparatus 10B has been described. Likewise, communication is performed between the game apparatus 10A and the game apparatus 10C and between the game apparatus 10B and the game apparatus 10C. Here, a case where the transmission process is performed before the reception process has been described. Alternatively, the reception process may be performed before the transmission process. Here, a case where the enemy location information data and the taken image data are transmitted/received every frame has been described. However, the taken image data does not necessary have to be transmitted/received every frame. Consequently, the taken image data may be transmitted/received, for example, every 60 frames. Accordingly, the processing load in each game apparatus 10 can be decreased.

Subsequent to the reception process at step S5, the CPU 311 of the game apparatus 10A executes a movement process for each object (step S6). Specifically, the CPU 311 moves the own aircraft 50A to a position in accordance with the operation data 332, moves the enemy aircraft 50B and the enemy aircraft 50C to respective positions represented by the enemy location information data 335, and moves non-player objects such as the missile 53 based on the main process program 322, and the like. At step S6, the CPU 311 not only moves the three-dimensional objects but also performs a process of changing orientations and postures of these objects. The process at step S6 is performed, and thereby the position coordinate data 334 representing the position coordinates of the own aircraft 50A is updated.

Next, the CPU 311 executes a virtual stereo camera control process (step S7) of controlling respective camera parameters regarding the virtual stereo camera 60 so that the virtual stereo camera 60 gazes the own aircraft 50A that is moving in the virtual three-dimensional space in accordance with the operation by the player. Specifically, the CPU 311 controls the camera parameters such as the imaging direction 61, a viewpoint position, a viewing angle, position coordinates, a movement speed, and the like of the virtual stereo camera 60 to appropriate values so that the virtual stereo camera 60 gazes the own aircraft 50A from a third person viewpoint located behind the own aircraft 50A while keeping a constant distance from the own aircraft 50A. When an operation on the 3D adjustment switch 25 is received in the input reception process at step S2, the CPU 311 changes the camera-to-camera distance E (see FIG. 16) based on the operation data 332 representing the operation on the 3D adjustment switch 25 at step S7. At this time, when the process at step S7 is performed, the camera-to-camera distance data 3332 is updated. Further, at step S7, the CPU 311 controls the stereoscopic vision reference distance D such that the value of the stereoscopic vision reference distance D (see FIG. 16) is in accordance with a state (e.g. movement speed, posture) of the own aircraft 50A. At this time, when the process at step S7 is performed, the stereoscopic vision reference distance data 3331 is updated.

Subsequent to the process at step S7, the CPU 311 executes a calculation process (step S8) of calculating position coordinates of the respective three-dimensional objects (in the exemplary embodiment, the own aircraft 50A, the enemy aircraft 50B, the enemy aircraft 50C, and the missile 53) in the virtual three-dimensional space constructed in the game apparatus 10A. The process of calculating the position coordinates is the same as the conventional method, and thus detailed description thereof is omitted here.

Subsequently, the CPU 311 executes a rendering process (step S9) of displaying the three-dimensional objects in the virtual three-dimensional space together with the two-dimensional objects (e.g. the taken images 51, 54 in the exemplary embodiment) which are not positioned within the virtual three-dimensional space on the upper LCD 22. The rendering process at step S9 is a process of rendering an image obtained by projecting the three-dimensional objects using perspective projection by means of the virtual stereo camera 60 together with an image obtained by projecting the two-dimensional objects using orthogonal projection by means of the inner imaging section 24 that is a real camera. When the process at step S9 is performed, the generated stereoscopic image (the image for left eye and the image for right eye) is outputted to the upper LCD 22, and thereby a game image as illustrated in FIG. 5 is stereoscopically displayed on the upper LCD 22. The rendering process at step S9 will be described later in detail with reference to FIG. 10 and FIG. 11.

Subsequent to the rendering process at step S9, the CPU 311 determines whether an instruction to end the game is received based on whether or not the power button 14F, and the like are operated (step S10). When the CPU 311 determines that no instruction to end the game is received (step S10: NO), the CPU 311 returns the processing to step S2 and repeats the subsequent steps. Meanwhile, when the CPU 311 determines that an instruction to end the game is received (step S10: YES), the CPU 311 ends the series of the game processes.

[Rendering Process]

Figure 10:
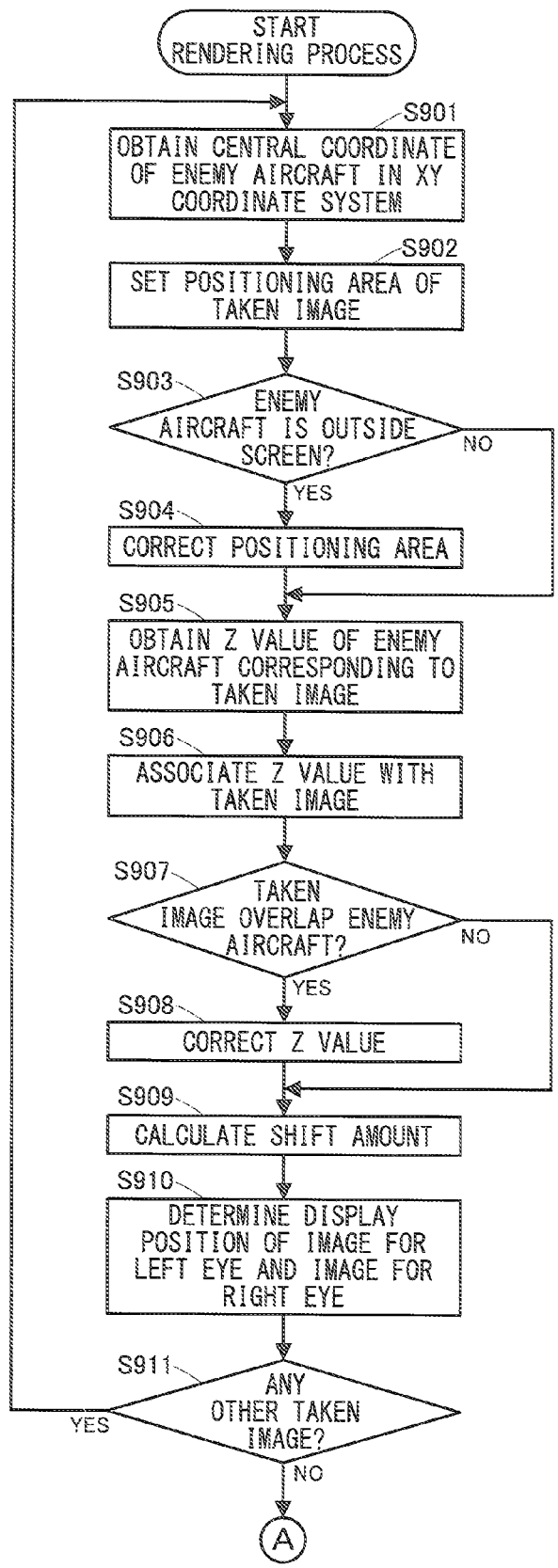
FIG. 10 is a flowchart illustrating in detail a non-limiting example of a rendering process at step S9 of FIG. 8.
Figure 11:
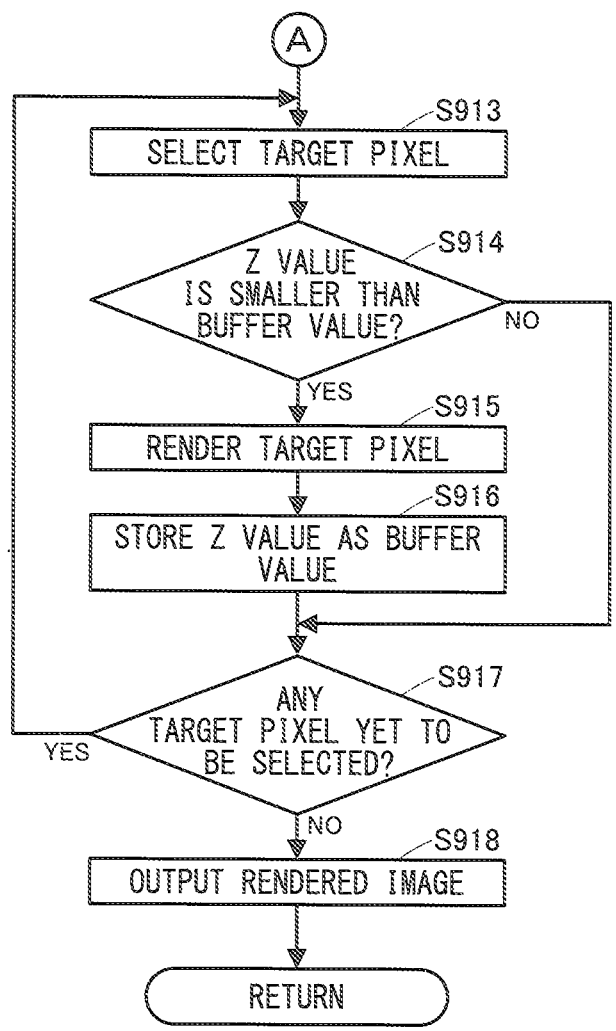
FIG. 11 is a flowchart illustrating in detail a non-limiting example of the rendering process at step S9 of FIG. 8.

In the following, the rendering process executed by the game apparatus 10A in accordance with the rendering process program 323 will be described with reference to FIG. 10 and FIG. 11. Here, FIG. 10 and FIG. 11 are detailed flowcharts of the rendering process at step S9 of FIG. 8. In the following, a process, performed in the game apparatus 10A, of stereoscopically displaying the taken image 51 representing the face of the player 2 operating the game apparatus 10B, with the same stereoscopic effect (at the same depth position) as the enemy aircraft 50B operated by the player 2, will be described. The similar process is performed for the enemy aircraft 50C and the taken image 54 representing the face of the player 3 operating the enemy aircraft 50C.

As the CPU 311 calculates the position coordinates of the respective three-dimensional objects in the process at step S8 described above, the CPU 311 obtains central coordinates (X1,Y1) (step S901) in the two-dimensional coordinate system (XY coordinate system) of the enemy aircraft 50B positioned in the virtual three-dimensional space (space represented by the XYZ-coordinate system (world coordinate system)).

Figure 12:
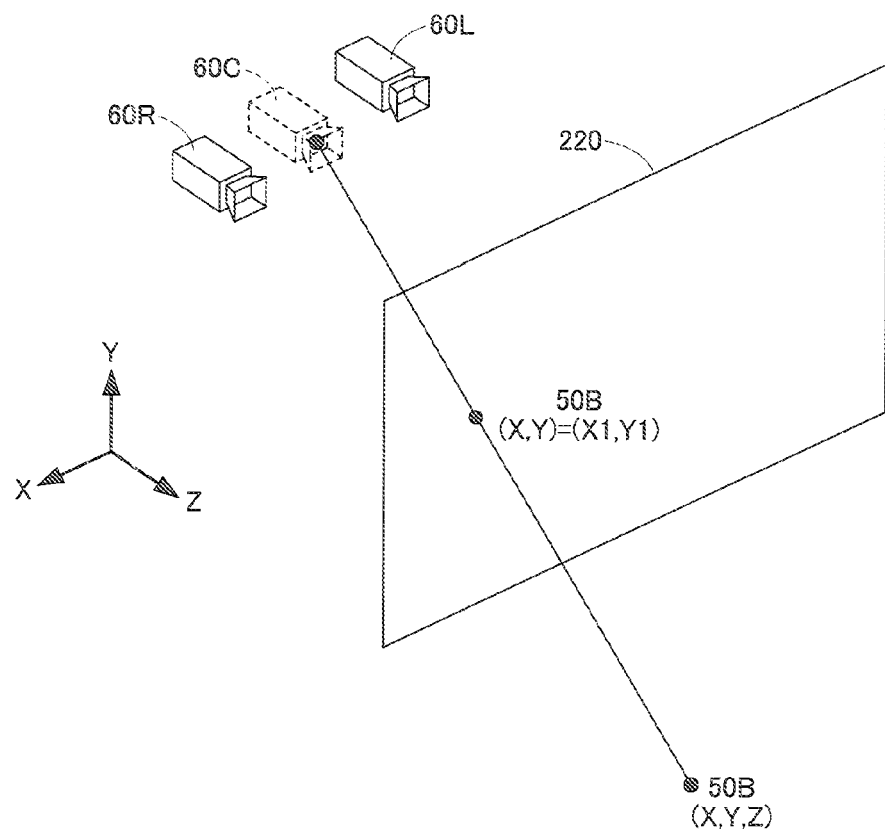
FIG. 12 is a diagram illustrating a non-limiting example of a method of obtaining central coordinates (X1,Y1) of an enemy aircraft 50B in an XY coordinate system (two-dimensional coordinate system)

FIG. 12 is a diagram illustrating a method of obtaining the central coordinates (X1,Y1) in the two-dimensional coordinate system (XY coordinate system) of the enemy aircraft 50B. In FIG. 12, the X-axis direction is the same direction as the rightward direction when the screen of the upper LCD 22 is seen from the front as shown in FIG. 1. The Y-axis direction is the same direction as the upward direction when the screen of the upper LCD 22 is seen from the front as shown in FIG. 1. The Z-axis direction is the same direction as the depth direction when the screen of the upper LCD 22 is seen from the front as shown in FIG. 1. In FIG. 12, for convenience of description, only the enemy aircraft 50B among the three-dimensional objects positioned in the virtual three-dimensional space is shown and the other three-dimensional objects (the own aircraft 50A, the enemy aircraft 50C, and the missile 53) are omitted.

As shown in FIG. 12, in the virtual three-dimensional space constructed in the game apparatus 10A, the virtual stereo camera 60 including the camera for left eye 60L and the camera for right eye 60R, and the enemy aircraft 50B are positioned. At step S901, firstly, the CPU 311 virtually places the screen of the upper LCD 22 between the virtual stereo camera 60 and the enemy aircraft 50B in the virtual three-dimensional space. The virtually placed screen of the upper LCD 22 is a virtual screen 220 in FIG. 12. The virtual screen 220 is the screen of the upper LCD 22 virtually placed in the virtual three-dimensional space. Thus, the virtual screen 220 has a size corresponding to the screen of the upper LCD 22. Specifically, the size of the virtual screen 220 is set such that the size of the virtual screen 220 in the X-axis direction thereof corresponds to the number of pixels of the X-axis direction of the upper LCD 22 and the size of the virtual screen 220 in the Y-axis direction thereof corresponds to the number of pixels of the Y-axis direction of the upper LCD 22. The position at which the virtual screen 220 is virtually placed is determined based on the imaging direction 61, the angle of view, and the like of the virtual stereo camera 60 (see FIG. 16). Further, in the exemplary embodiment, the virtual screen 220 is positioned on the same plane as the reference surface. However, for convenience of description, the virtual screen 220 is shown so as to be shifted from the reference surface in FIG. 16. The virtual screen 220 does not necessary have to be positioned at the same plane as the reference surface and may be positioned regardless of the reference surface. After having virtually placed the virtual screen 220, the CPU 311 obtains a line segment that connects the viewpoint position (a viewpoint position of a midpoint camera 60C positioned at a midpoint between the camera for left eye 60L and the camera for right eye 60R) of the virtual stereo camera 60 and the enemy aircraft 50B. Then, the CPU 311 obtains a point, on the plane (XY coordinate system) including the virtual screen 220, at which the line segment that connects the viewpoint position of the virtual stereo camera 60 and the enemy aircraft 50B intersects with the plane, as central coordinates (X1,Y1) of the enemy aircraft 50B. Data representing the central coordinates (X1,Y1) of the enemy aircraft 50B obtained as above is stored in the work area 331 as the central coordinate data 336.

Next, the CPU 311 sets the positioning area 222 of the taken image 51 on the plane (XY coordinate system) including the virtual screen 220 (step S902).

Figure 13:
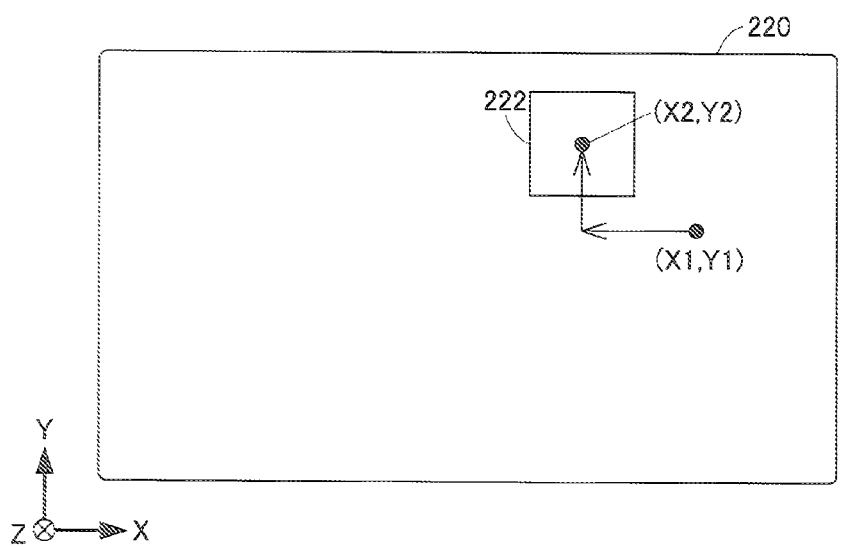
FIG. 13 is a diagram illustrating a non-limiting example of a method of determining a positioning area 222 of a taken image 51 in an XY coordinate system (two-dimensional coordinate system)

FIG. 13 is a diagram illustrating a method of determining a positioning area of the taken image 51 in the XY coordinate system (two-dimensional coordinate system). At step S902, the CPU 311 obtains, as information for identifying the positioning area 222, XY coordinates of four corners of the positioning area 222 that is an area whose center is at a position a predetermined amount (for the predetermined number of pixels) shifted, for example, to the upper left from the central coordinates (X1, Y1) of the enemy aircraft 50B in the XY coordinate system. The process at step S902 is performed and thereby a location and a size of the taken image 51 on the screen of the upper LCD 22 are determined. Accordingly, depending on how the respective XY coordinates of the four corners of the positioning area 222 are set at step S902, the size of the taken image 51 that is stereoscopically displayed can be maintained at a constant size, or can be changed. Consequently, each of the respective XY coordinates of the four corners of the positioning area 222 are determined so as to be an appropriate position by taking the size of the taken image 51 to be stereoscopically displayed into consideration. In the exemplary embodiment, the respective XY coordinates of the four corners of the positioning area 222 are set such that the size of the positioning area 222 is maintained constant. Thereby, the player 1 operating the own aircraft 50A can easily view that the player 2 is operating the enemy aircraft 50B. The respective XY coordinates of the four corners of the positioning area 222 are determined as described above, and data representing these four XY coordinates are stored in the work area 331 as the location coordinate data 337.

Subsequent to the process at step S902, the CPU 311 determines whether the enemy aircraft 50B is positioned outside the screen of the upper LCD 22 (step S903). As shown in FIG. 12, when the central coordinates (X1,Y1) of the enemy aircraft 50B obtained in the process at step S901 described above are coordinates on the virtual screen 220, the enemy aircraft 50B is stereoscopically displayed on the upper LCD 22. Meanwhile, when the central coordinates (X1,Y1) of the enemy aircraft 50B are coordinates outside the virtual screen 220, the enemy aircraft 50B is not displayed on the upper LCD 22. Consequently, at step S903, the CPU 311 determines whether the enemy aircraft 50B is positioned outside the screen of the upper LCD 22 based on whether the central coordinates (X1,Y1) of the enemy aircraft 50B represented by the central coordinate data 336 are coordinates on the virtual screen 220 that corresponds to the screen of the upper LCD 22.

Figure 14:
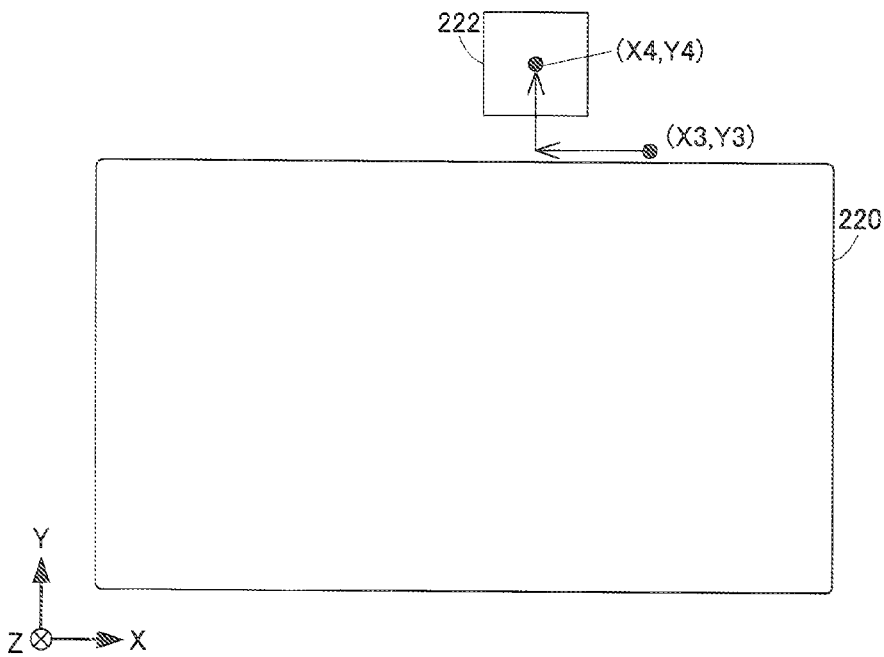
FIG. 14 is a diagram illustrating a non-limiting example of a state in which a part of the positioning area 222 of the taken image 51 is positioned outside a virtual screen 220 in an XY coordinate system (two-dimensional coordinate system)

In the exemplary embodiment, as shown in FIG. 5, the taken image 51 representing the face of the player 2 operating the enemy aircraft 50B is stereoscopically displayed to the upper left of the enemy aircraft 50B. That is, as described above, the positioning area 222 is set to a position a predetermined amount shifted to the upper left from the central coordinates (X1,Y1) of the enemy aircraft 50B. Consequently, as shown in FIG. 14, for example, the positioning area 222 whose center is positioned at XY coordinates (X4, Y4) that are set at a position a predetermined amount shifted to the upper left from the central coordinates (X3, Y3) of the enemy aircraft 50B positioned outside the virtual screen 220, are positioned outside the virtual screen 220 in the same manner as the central coordinates (X3, Y3). Consequently, not only the enemy aircraft 50B positioned ahead and above the own aircraft 50A is not displayed on the upper LCD 22 but also the taken image 51 representing the face of the player 2 operating the enemy aircraft 50B is not displayed on the upper LCD 22. As a result, the player 1 operating the own aircraft 50A cannot perceive the direction in which the enemy aircraft 50B is positioned and the player operating the enemy aircraft 50B, thereby deteriorating operability of the game.

Figure 15:
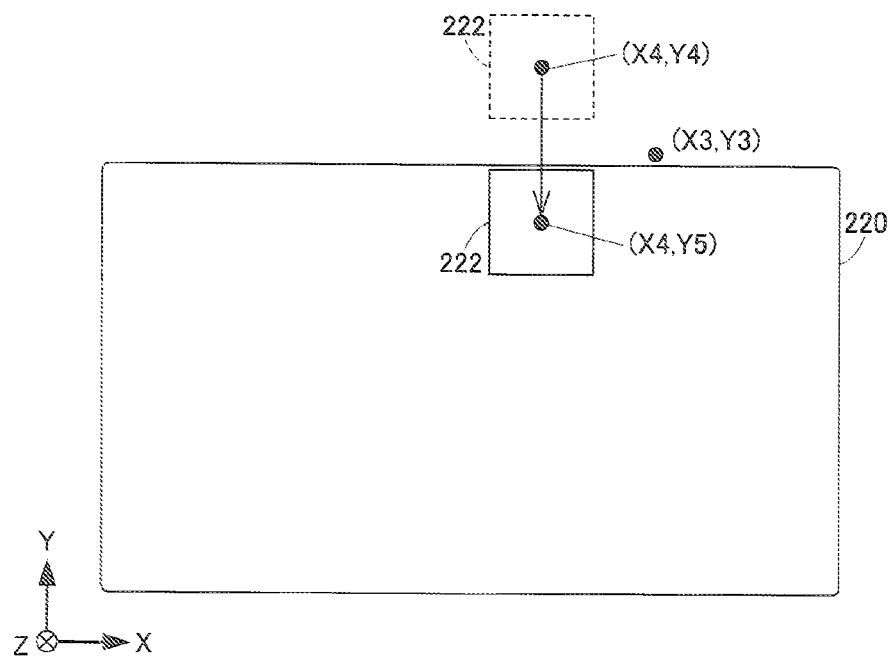
FIG. 15 is a diagram illustrating a non-limiting example of a method of correcting the positioning area 222 of the taken image 51.

In view of this, when having determined that the enemy aircraft 50B is positioned outside the screen of the upper LCD 22 (step S903: YES), the CPU 311 corrects the positioning area 222 set in the process at step S902 (step S904). Specifically, as shown in FIG. 15, the CPU 311 corrects the position of the positioning area 222 such that the entire positioning area 222 having the center at XY coordinates (X4, Y4) is positioned within the virtual screen 220, that is, XY coordinates of the center of the positioning area 222 is positioned at (X4, Y5). The process at step S904 is performed and thereby the location coordinate data 337 stored in the work area 331 in the process at step S902 is updated. Here, a case where the positioning area 222 is shifted so as to be within the virtual screen 220 by correcting only the Y coordinate of the positioning area 222 has been described. Alternatively, the positioning area 222 may be shifted so as to be within the virtual screen 220 by correcting only the X coordinate of the positioning area 222, or may be shifted so as to be within the virtual screen 220 by correcting both of the X coordinate and the Y coordinate of the positioning area 222.

In a case where the central coordinates (X3, Y3) of the enemy aircraft 50B are widely separated from the virtual screen 220, if the correction process at step S904 of shifting the position of the positioning area 222 so as to be within the virtual screen 220 is performed, the taken image 51 is displayed at a position widely separated from the enemy aircraft 50B. This may results in a problem that the player 1 operating the own aircraft 50A cannot accurately identify the position of the enemy aircraft 50B. Consequently, when the central coordinates (X3, Y3) of the enemy aircraft 50B are a predetermined distance away from the virtual screen 220, the process at step S904 does not have to be performed.

In addition, the process at step S904 may be performed, not only when the XY coordinates of the enemy aircraft 50B are positioned outside the virtual screen 220, but also when the positioning area 222 is set outside the virtual screen 220 by the process at step S902 even though the XY coordinates of the enemy aircraft 50B are positioned within the virtual screen 220.

When the CPU 311 performs the correction process at step S904 or when the CPU 311 determines that enemy aircraft 50B is not positioned outside the screen of the upper LCD 22 (positioned within the screen) (step S903: NO), the CPU 311 obtains a Z value of the enemy aircraft 50B corresponding to the taken image 51 (step S905). Specifically, the CPU 311 extracts a Z value that is a component of the Z-axis direction from the position coordinates (X, Y, Z) of the enemy aircraft 50B, which are represented by the enemy location information data 335 stored in the work area 331. As described above, the CPU 311 obtains a Z value in accordance with a state (here, a distance between the viewpoint position of the virtual stereo camera 60 and the enemy aircraft 50B in the imaging direction 61) of the virtual three-dimensional space.

Then, the CPU 311 stores the Z value as Z value data 339 representing a depth value of the taken image 51, and thereby the extracted Z value of the enemy aircraft 50B is associated with the taken image 51 (step S906).

As described above, the positioning area 222 set in the process at step S902 is a position the predetermined amount shifted to the upper left from the central coordinates (X1,Y1) of the enemy aircraft 50B. Thus, when the taken image 51 is positioned in the positioning area 222, the taken image 51 does not overlap the enemy aircraft 50B. However, there is a case where the taken image 51 overlaps the enemy aircraft 50B when the position of the positioning area 222 is corrected in the process at step S904. In such a case, because the taken image 51 is associated with the Z value of the enemy aircraft 50B, the rendering process may not be performed appropriately when rendering the taken image 51 together with the enemy aircraft 50B.

Consequently, subsequent to step S906, the CPU 311 determines whether the taken image 51 overlaps the enemy aircraft 50B when the taken image 51 is stereoscopically displayed together with the enemy aircraft 50B (step S907). Specifically, by taking a size, a posture, and the like of the enemy aircraft 50B in the virtual three-dimensional space into consideration, the CPU 311 determines whether the positioning area 222 (the positioning area 222 corrected in the process at step S904 if a result of the determination at step S903 is "YES") set in the process at step S902 overlaps, in the XY coordinate system, the enemy aircraft 50B which is positioned with reference to the central coordinates (X1, Y1) obtained in the process at step S901.

When the CPU 311 determines that the taken image 51 overlaps the enemy aircraft 50B (step S907: YES), the CPU 311 corrects the Z value associated with the taken image 51 in the process at step S906 (step S908). Specifically, the CPU 311 updates the Z value data 339 so that the Z value represented by the Z value data 339 stored in the work area 331 in the process at step S906 becomes slightly smaller than the Z value of the enemy aircraft 50B. The process at step S908 is performed, and thereby the rendering process that involves a so-called Z test can be performed normally. As a result, the taken image 51 can be prevented from being hidden by the enemy aircraft 50B by displaying the taken image 51 closer to the user in the depth direction than the enemy aircraft 50B. It should be noted that if the Z value associated with the taken image 51 is made too small in the process at step S908, the stereoscopic effect of the taken image 51 can be quite different from that of the enemy aircraft 50B (the taken image 51 is viewed as if it is positioned considerably closer to the user in the depth direction than the enemy aircraft 50B). This may result in deteriorating the visual effect for causing the taken image 51 to be viewed as if it is positioned at the same depth position as the enemy aircraft 50B in the virtual three-dimensional space. Thus, in view of this, an amount of correction of the Z value in the process at step S908 is set to an appropriate value.

When the CPU 311 performs the process at step S908 or when the CPU 311 determines that the taken image 51 does not overlap the enemy aircraft 50B (step S907: NO), the CPU 311 calculates a shift amount P between an image for left eye of the taken image 51 viewed with the left eye of the player 1 and an image for right eye of the taken image 51 viewed with the right eye of the player 1 in the horizontal direction (Y-axis direction) on the screen of the upper LCD 22 (step S909).

Figure 16:
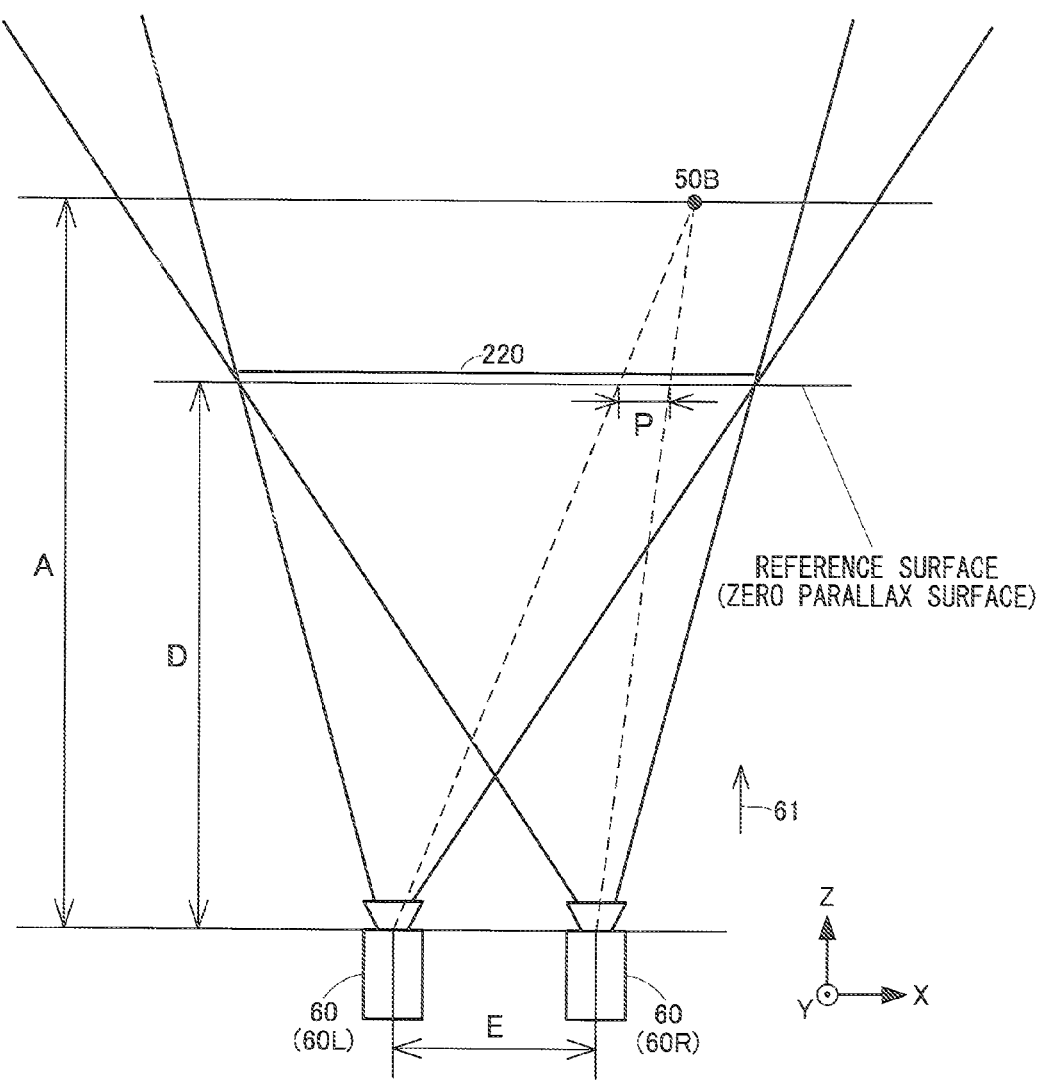
FIG. 16 is a schematic view illustrating a non-limiting example of a virtual three-dimensional space for describing a method of calculating a shift amount P of the enemy aircraft 50B.

FIG. 16 a schematic view illustrating a virtual three-dimensional space for describing a method of calculating the shift amount P of the enemy aircraft 50B. In FIG. 16, P is a shift amount between the image for left eye and the image for right eye of the taken image 51 on the screen of the upper LCD 22. An object distance A is a distance between the viewpoint position of the virtual stereo camera 60 and the enemy aircraft 50B in the imaging direction 61. The object distance A is changed, as appropriate, in accordance with the operation (i.e. the enemy location information data 335) by the player 2 on the game apparatus 10B. The stereoscopic vision reference distance D is a distance between the viewpoint position of the virtual stereo camera 60 and the reference surface in the imaging direction 61. The camera-to-camera distance E is a distance (base-line length) between the camera for left eye 60L and the camera for right eye 60R which configure the virtual stereo camera 60. The camera-to-camera distance E is changed, as appropriate, in accordance with the operation on the 3D adjustment switch 25 performed by the player 1.

Among the shift amount P, the object distance A, the stereoscopic vision reference distance D, and the camera-to-camera distance E, a relationship of ratios below is established based on similarity of triangle.

$$P:E=(A-D):A$$

By transforming the above formula, the shift amount P can be represented by the formula below.

$$E(A-D)=PA$$

$$P=E(A-D)/A$$

At step S909, the CPU 311 substitutes, in the right side of the formula, the camera-to-camera distance E represented by the camera-to-camera distance data 3332, the object distance A calculated based on the viewpoint position of the virtual stereo camera 60 and the position coordinate (X, Y, Z) of the enemy aircraft 50B represented by the enemy location information data 335, and the stereoscopic vision reference distance D represented by the stereoscopic vision reference distance data 3331, thereby calculating the shift amount P.

The arithmetic expression described above representing the shift amount P includes the camera-to-camera distance E as a variable. Consequently, the shift amount P which is one of parameters for determining the display area of a two-dimensional object is updated as appropriate by the CPU 311 based on, for example, the change in the camera-to-camera distance E in accordance with the operation on the 3D adjustment switch 25.

As the CPU 311 calculates the shift amount P as above, the CPU 311 determines the display area 222L of the image for left eye and the display area 222R of the image for right eye of the taken image 51 (step S910). Specifically, the CPU 311 determines respective two-dimensional coordinates of the four corners of the display area 222L of the image for left eye and respective two-dimensional coordinates of the four corners of the display area 222R of the image for right eye, based on the two-dimensional coordinates of the positioning area 222 and the shift amount P.

Figure 17:
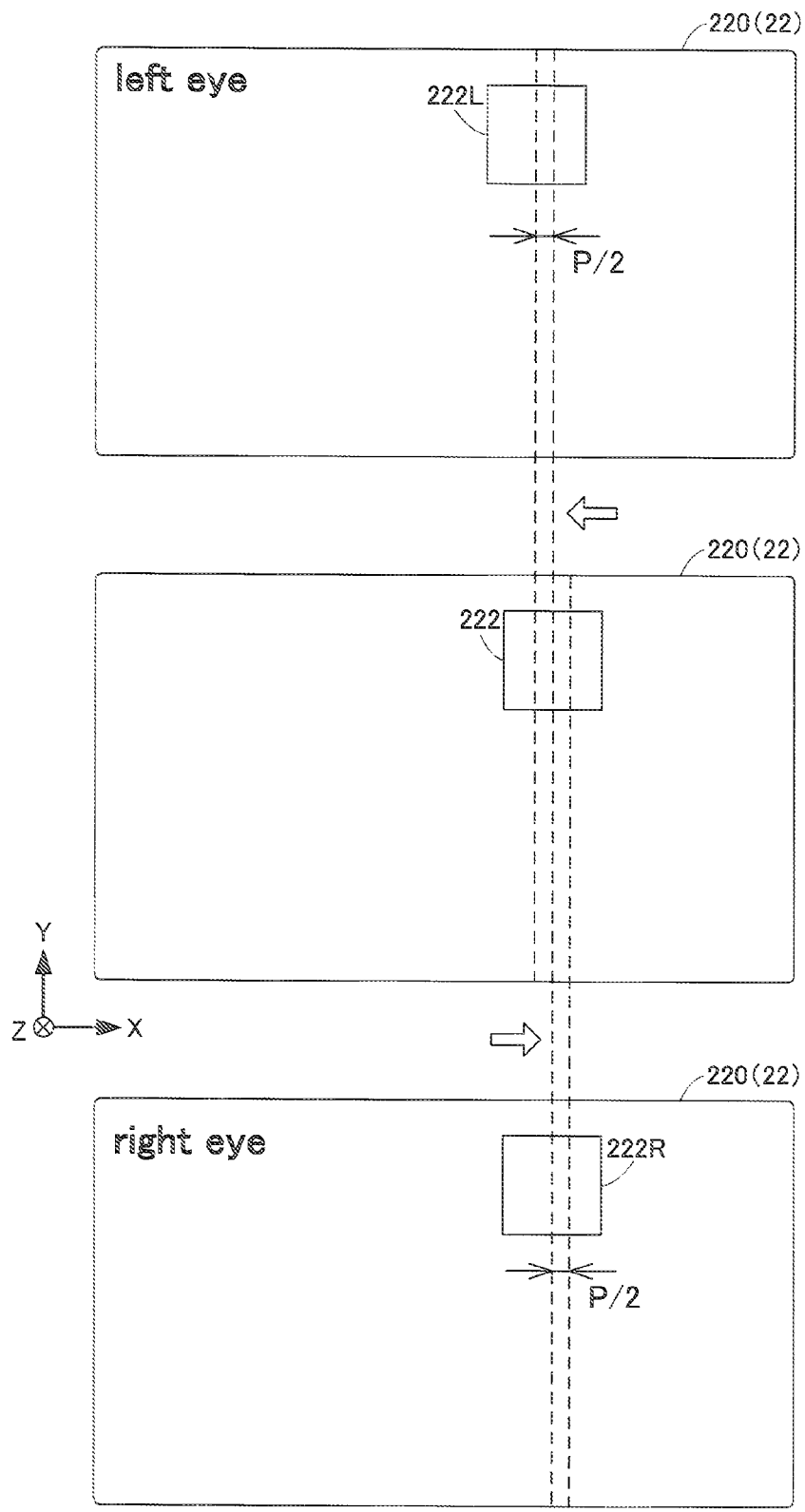
FIG. 17 is a diagram illustrating a non-limiting example of a display area 222L of an image for left eye and a display area 222R of an image for right eye.

FIG. 17 is a figure illustrating the display area 222L of the image for left eye and the display area 222R of the image for right eye. In the exemplary embodiment, the taken image 51 is reproduced at a position deeper in the depth direction than the screen of the upper LCD 22 in the same manner as the enemy aircraft 50B. Consequently, at step S910, the CPU 311 determines the display area 222L of the image for left eye of the enemy aircraft 50B to be at a position shifted by P/2 to the left (direction opposite to the X-axis direction) of the positioning area 222, and determines the display area 222R of the image for right eye of the enemy aircraft 50B to be at a position shifted by P/2 to the right (X-axis direction) of the positioning area 222. The CPU 311 performs the process at step S910 and thereby parameters (the respective two-dimensional coordinates of the four corners of each of the display areas 222L, 222R) representing the size of the two-dimensional object (here, the taken image 51) are set.

Subsequent to the process at step S910, the CPU 311 determines whether there is any other taken image for determining a display area thereof (step S911). At this time, when the CPU 311 determines that there is a taken image for determining the display area (step S911: YES), the CPU 311 returns the processing to step S901. In the exemplary embodiment, the processing is returned to step S901 when the display area of the enemy aircraft 50C is not determined.

The CPU 311 repeatedly executes a series of processes at step S913 to S917 and thereby the three-dimensional objects (in the exemplary embodiment, the own aircraft 50A, the enemy aircraft 50B, the enemy aircraft 50C, the missile 53, the landform object) in the virtual three-dimensional space are rendered together with the two-dimensional objects (in the exemplary embodiment, the taken images 51, 54) which are not positioned within the virtual three-dimensional space.

That is, when the CPU 311 determines that there is no other taken image for determining the display area (step S911: NO), the CPU 311 selects a target pixel to be rendered in the frame buffer 3131 (step S913). Specifically, the CPU 311 selects any pixel among pixels which configure the respective three-dimensional objects and pixels which configure the respective two-dimensional objects as a target pixel. The target pixel is a pixel which configures a part of a target object (a three-dimensional object or a two-dimensional object) which is a rendering target.

Having selected the target pixel, the CPU 311 determines whether a Z value of the target pixel is smaller than or equal to the buffer value already stored in the Z buffer 3132 (step S914). Specifically, the CPU 311 firstly obtains a Z value of the target pixel. For example, when the target pixel is a pixel which configures the own aircraft 50A, the CPU 311 extracts a Z value from the position coordinates (X, Y, Z) of the own aircraft 50A represented by the position coordinate data 334. For example, when the target pixel is a pixel which configures the enemy aircraft 50B, the CPU 311 extracts a Z value from the position coordinates (X, Y, Z) of the enemy aircraft 50B represented by the enemy location information data 335. For example, when the target pixel is a pixel which configures the taken image 51, the CPU 311 obtains the Z value of the taken image 51 represented by the Z value data 339 as the Z value of the target pixel. For example, when the target pixel is a pixel which configures the taken image 54, the CPU 311 obtains the Z value of the taken image 54 represented by the Z value data 339 as the Z value of the target pixel.

After having obtained the Z value of the target pixel as described above, the CPU 311 determines whether the obtained Z value is smaller than the buffer value (Z value) in the Z buffer 3132 corresponding to a storage location in the frame buffer 3131 in which the pixel is to be rendered (step S914). Thus, the CPU 311 executes the Z test (depth test) on the target pixel selected in the process at step S913.

When having determined that the Z value of the target pixel is smaller than the buffer value (step S914: YES), the CPU 311 causes the GPU 312 to execute the process of rendering the target pixel in the frame buffer 3131 (step S915). At this time, when the target pixel is a pixel which configures a two-dimensional object, the GPU 312 renders the target pixel at a position corresponding to the display area (the display area 222L or the display area 222R) determined in the process at step S910. Meanwhile, when the target pixel is a pixel which configures a three-dimensional object, the CPU 311 renders the target pixel at the storage location corresponding to the two-dimensional coordinates obtained through projective transformation by using the camera for left eye 60L or the camera for right eye 60R.

After having rendered the target pixel in the process at step S915, the GPU 312 stores the Z value of the target pixel in the Z buffer 3132 as the buffer value corresponding to the storage location in the frame buffer 3131 in which the target pixel is rendered (step S916).

When having performed the process at step S916 or when having determined that the Z value is not smaller than the buffer value (step S914: NO), the CPU 311 determines whether there is any target pixel yet to be selected (step S917). When having determined that there is a target pixel yet to be selected (step S917: YES), the CPU 311 returns the processing to step S913. Accordingly, the processes at step S913 to S917 are executed for all of the target pixels, and thereby the image for left eye and the image for right eye are rendered in the frame buffer 3131.

Thus, while the GPU 312 compares the Z value associated with the two-dimensional object with the Z value associated with the three-dimensional object by using the Z buffer 3132, the GPU 312 synthesizes the image for left eye and the image for right eye of the two-dimensional object with the image for left eye and the image for right eye of the three-dimensional object and renders the synthesized images. That is, the respective images for left eye of the two-dimensional object and the three-dimensional object are rendered together, and the respective images for right eye of the two-dimensional object and the three-dimensional object are rendered together. Accordingly, a stereoscopic image including the synthesized image for left eye and the synthesized image for right eye are generated.

When the CPU 311 determines that there is no target pixel yet to be selected (step S917: NO), that is, when the entire image for left eye and the entire image for right eye of the two-dimensional object and the three-dimensional object are rendered in the frame buffer 3131, the CPU 311 causes the GPU 312 to output the image for left eye and the image for right eye having been rendered on the upper LCD 22 (step S918).

By the series of processes as above, the image for left eye and the image for right eye obtained by capturing the three-dimensional object in the virtual three-dimensional space by the virtual stereo camera 60 (two virtual cameras) are rendered together with the image for left eye and the image for right eye obtained by shifting the two-dimensional object to the left and right based on the shift amount P. Then, the synthesized image for left eye and the synthesized image for right eye having been synthesized as above are outputted to the upper LCD 22 and thereby the three-dimensional object and the two-dimensional object are stereoscopically displayed together.

Figure 18:
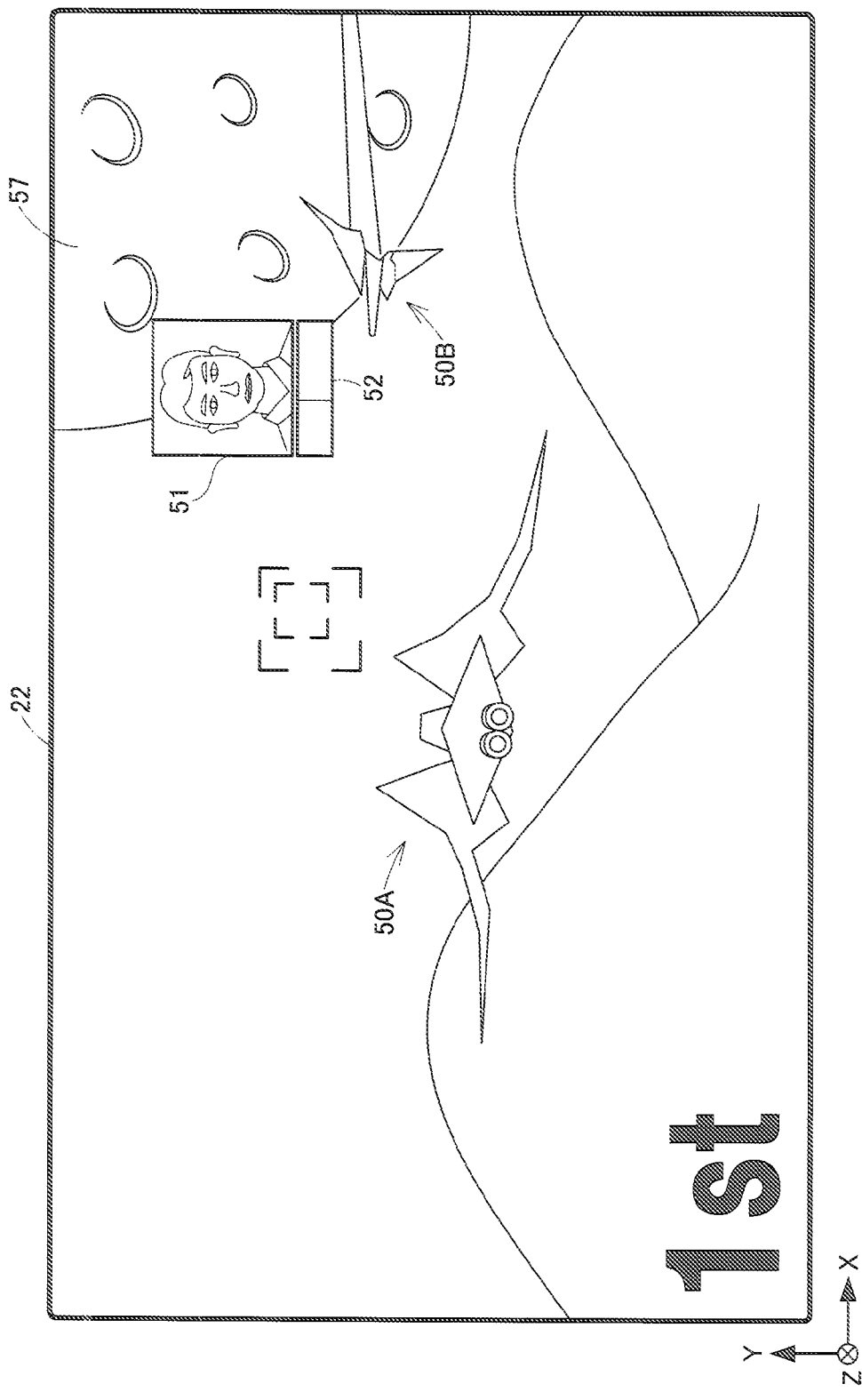
FIG. 18 is a screen diagram illustrating a non-limiting example of an image stereoscopically displayed on the upper LCD 22.
Figure 19:
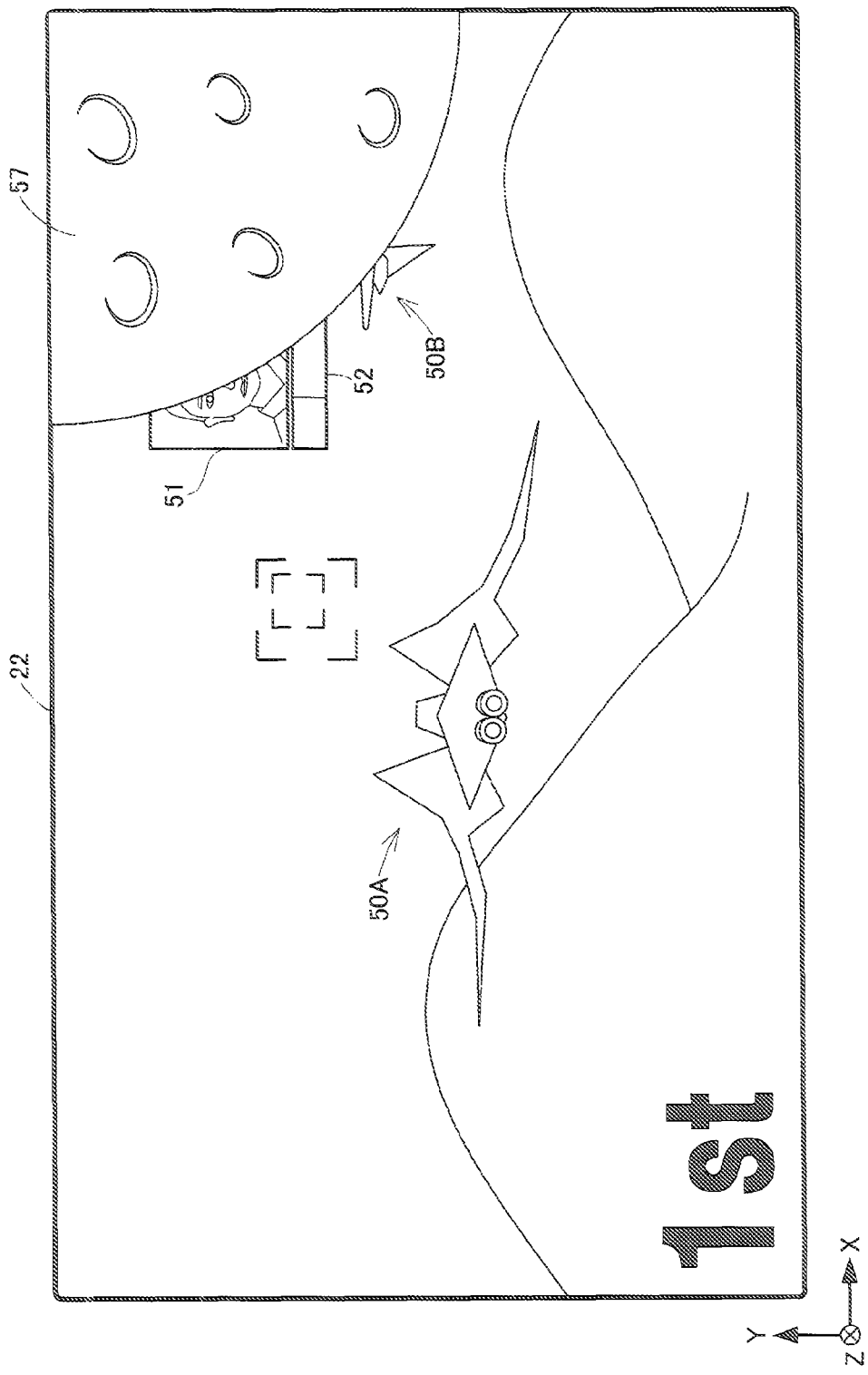
FIG. 19 is a screen diagram illustrating a non-limiting example of an image stereoscopically displayed on the upper LCD 22.

FIG. 18 and FIG. 19 are each a screen diagram illustrating an example of an image stereoscopically displayed on the upper LCD 22. When the Z value of the enemy aircraft 50B is smaller than the Z value of the planet object 57, the enemy aircraft 50B is stereoscopically displayed so as to hide a part of the planet object 57 and to be closer to the user in the depth direction than the planet object 57. At this time, because the taken image 51 corresponding to the enemy aircraft 50B is assigned a Z value the same as or slightly smaller than the Z value of the enemy aircraft 50B, the taken image 51 is also stereoscopically displayed closer to the user in the depth direction than the planet object 57, as shown in FIG. 18.

On the other hand, when the Z value of the enemy aircraft 50B is larger than the Z value of the planet object 57, the enemy aircraft 50B is stereoscopically displayed such that a part thereof is hidden by the planet object 57 and deeper in the depth direction than the planet object 57. At this time, because the Z value assigned to the taken image 51 corresponding to the enemy aircraft 50B is larger than the Z value of the planet object 57, the taken image 51 is also stereoscopically displayed deeper in the depth direction than the planet object 57, as shown in FIG. 19.

Thus, the taken image 51 which is a two-dimensional object originally having no Z value is assigned a Z value the same as or slightly smaller than the Z value of the enemy aircraft 50B which is a three-dimensional object in the virtual three-dimensional space, thereby effectively causing a masking effect (effect of hiding an object at a deeper position in a depth direction by an object closer to the user in the depth direction).

[Functions and Effects of the Exemplary Embodiment]

As describe above, in the exemplary embodiment, a two-dimensional object such as the taken image 51 is stereoscopically displayed at a depth position in accordance with the state (for example, a depth position of the enemy aircraft 50B) of the virtual three-dimensional space. Consequently, when a two-dimensional object that does not exist within the virtual three-dimensional space is stereoscopically displayed together with a three-dimensional object in the virtual three-dimensional space, the two-dimensional object can be stereoscopically displayed naturally without giving a user a sense of discomfort.

Further, in the exemplary embodiment, parameters (e.g. the size of the taken image 51) other than the depth value of the two-dimensional object (e.g. the taken image 51) are set regardless of the state of the virtual three-dimensional space. Consequently, a mode of the two-dimensional object can be flexibly changed without being affected by the state of the virtual three-dimensional space. That is, the size and the like of the two-dimensional object can be controlled regardless of (independent from) the depth position at which the stereoscopically displayed two-dimensional object appears to be positioned.

Further, in the exemplary embodiment, there is an advantage that the size of the two-dimensional object can be set without being affected by the change in the depth position of the two-dimensional object (e.g. the taken image 51).

Further, in the exemplary embodiment, the parameter representing the size of the two-dimensional object (e.g. the taken image 51) is maintained constant. Because the state of the virtual three-dimensional space affects only the depth value of the two-dimensional object, even when the depth position of the two-dimensional object changes, the size of the two-dimensional object can be maintained constant.

Further, in the exemplary embodiment, the display area of the two-dimensional object is determined based on the position, on the screen of the upper LCD 22, at which the three-dimensional object is displayed. Consequently, information (such as the face of the user operating the enemy aircraft 50B) represented by the two-dimensional object can be provided to the user effectively.

When it is assumed that the display area of the two-dimensional object is determined based on the relationship between the two-dimensional object and the three-dimensional object in the virtual three-dimensional space which is a three-dimensional coordinate system, because the virtual three-dimensional space is projected using perspective projection by means of the virtual stereo camera 60, the size of the display area of the two-dimensional object may change in accordance with the distance from the virtual stereo camera 60. On the other hand, in the exemplary embodiment, a display area of the two-dimensional object is determined based on a display position on the screen of the upper LCD 22, that is a display position ((X1,Y1) in FIG. 12) of the three-dimensional object in the two-dimensional coordinate system. Consequently, for example, when the depth value is associated with the two-dimensional object so as to be positioned at the same depth position as the three-dimensional object, the size (width of the display area) of the two-dimensional object can be prevented from being changed in accordance with the distance between the virtual stereo camera 60 and the three-dimensional object.

Further, in the exemplary embodiment, the two-dimensional object can be stereoscopically displayed in accordance with the depth position of the three-dimensional object. That is, the two-dimensional object that does not exist within the virtual three-dimensional space can be represented naturally being positioned at the same depth position as an object in the virtual three-dimensional space.

Further, in the exemplary embodiment, the camera-to-camera distance E is changed by operating the 3D adjustment switch 25, and thereby the stereoscopic effect of the three-dimensional object is changed. The shift amount represented by the shift amount data 340 is calculated in accordance with the camera-to-camera distance E. Consequently, the stereoscopic effect of the two-dimensional object is also changed in the same manner. As a result, the relationship between the stereoscopic effect of the three-dimensional object and the stereoscopic effect of the two-dimensional object can be maintained constant.

Further, in the exemplary embodiment, the obtained depth value is associated with the two-dimensional object, and thus a stereoscopic image can be generated appropriately even when a plurality of two-dimensional objects exist as illustrated in the exemplary embodiment.

Further, in the exemplary embodiment, the Z buffer 3132 is used in the process of rendering the three-dimensional object and the two-dimensional object. Consequently, it is possible to prevent an image from being stereoscopically displayed in manner such that the depth values of the respective objects are inconsistent, for example, as in a case of an image in which the two-dimensional object is stereoscopically displayed deeper in the depth direction than the three-dimensional object in the virtual three-dimensional space even though the two-dimensional object is associated with the depth value so as to be stereoscopically displayed closer to the user in the depth direction than the three-dimensional object.

Further, in the exemplary embodiment, the two-dimensional object is a taken image representing a human face captured by the inner imaging section 24. Consequently, a visual effect as if a face of a human who does not exist within a virtual three-dimensional space exists in the virtual three-dimensional space can be exerted.

Further, in the exemplary embodiment, the two-dimensional objects are the taken images 51, 54 obtained in real time by the inner imaging section 24. Consequently, a visual effect for causing the two-dimensional object that does not exist within the virtual three-dimensional space to be viewed as if it exists in the virtual three-dimensional space and moves in the virtual three-dimensional space can be easily exerted.

Further, in the exemplary embodiment, the two-dimensional object is the taken image 51 obtained by the game apparatus 10A communicating with the game apparatus 10B which is an external apparatus. Consequently, a visual effect for causing the taken image 51 that the game apparatus 10A does not have, to be viewed as if it exists in the virtual three-dimensional space constructed in the game apparatus 10A can be obtained.

[Modification]

The exemplary embodiment is not limited to the above modes, and may be realized as, for example, the following modes.

That is, in the exemplary embodiment described above, a case where the predetermined two-dimensional objects are the taken images 51, 54 originally having no depth value has been described. Alternatively, the predetermined two-dimensional object of the exemplary embodiment may be a two-dimensional object which is not in a form of an image, or may be a two-dimensional object obtained by projecting a three-dimensional object using orthogonal projection. That is, the predetermined two-dimensional objects of the exemplary embodiment may be a two-dimensional object having no depth value, which is obtained by transforming a three-dimensional object by removing the depth value.

Further, in the exemplary embodiment described above, a case where the parameter is a parameter representing the size of the two-dimensional object such as the taken image 51 has been described. Alternatively, the parameter may be a parameter representing, for example, a shape of the two-dimensional object.

Further in the exemplary embodiment, a case where the display area (e.g. the display areas 222L, 222R of the taken image 51) of the two-dimensional object is determined based on the two-dimensional coordinates of the three-dimensional object (e.g. the enemy aircraft SOB) has been described. Alternatively, the display area of the two-dimensional object may be determined regardless of the two-dimensional coordinates of the three-dimensional object.

Further, in the exemplary embodiment described above, a case where the Z value in accordance with the object distance A (see FIG. 16) between the viewpoint position of the virtual stereo camera 60 and the three-dimensional object (e.g. the enemy aircraft SOB) is obtained has been described. Alternatively, the Z value to be obtained may be obtained regardless of the object distance A. For example, when the state of the virtual three-dimensional space changes from a first state to a second state different from the first state, a first Z value may be obtained in the first state and a second Z value different from the first Z value may be obtained in the second state.

Further, in the exemplary embodiment described above, a case where the taken image (e.g. the taken image 51) stereoscopically displayed in the game apparatus 10A is received from an external apparatus (e.g. the game apparatus 10B) has been described. Alternatively, the taken image to be stereoscopically displayed in the game apparatus 10A may be an image captured in the game apparatus 10A.

Further, in the exemplary embodiment described above, a case where the taken image (e.g. the taken image 51) stereoscopically displayed in the game apparatus 10A is a taken image obtained in real time by the inner imaging section 24 of an external apparatus (e.g. the game apparatus 10B) has been described. Alternatively, the taken image to be stereoscopically displayed in the game apparatus 10A may be an image stored previously in an external apparatus.

Further, in the exemplary embodiment described above, a case where the taken image 51 captured by the inner imaging section 24 of the game apparatus 10B is stereoscopically displayed on the upper LCD 22 of the game apparatus 10A has been described. Alternatively, the taken image to be stereoscopically displayed in the game apparatus 10A may be an image captured by, for example, the inner imaging section 24 of the game apparatus 10A.

Further, in the exemplary embodiment described above, a case where the taken image stereoscopically displayed in the game apparatus 10A is a taken image representing a human face has been described. Alternatively, the taken image to be stereoscopically displayed is not limited to a taken image representing a human face. For example, the taken image to be stereoscopically displayed may be a taken image that does not include a human face, which is obtained using the outer imaging section 23 as a non-stereo camera.

Further, in the exemplary embodiment described above, the series of processes described above are realized by a single game apparatus 10. Alternatively, the series of processes may not be necessarily realized by the single game apparatus 10. Multiple information processing apparatuses may work in cooperation with each other to realize the series of processes described above. That is, at least one of the functions of an obtaining unit, an association unit, a generation unit, and a display control unit may be realized by using, for example, a server apparatus on a network other than the game apparatus 10. In this case, a game system including the game apparatus 10 and the server apparatus functions in the same manner as the game apparatus 10 described above.

Further, in the exemplary embodiment described above, the shape of the game apparatus 10 is an example only. The shapes and the number of the various operation buttons 14 and the touch panel 13 are examples only, and the positions at which the various operation buttons 14 and the touch panel 13 are mounted, respectively, are also examples only. It is understood that other shapes, other number, or other positions may be used for realizing the exemplary embodiment. The order of the process steps, the setting values, the thresholds used for determinations, and the like which are used in the processing described based on the flowchart described above are examples only. It is understood that other order of process steps and other values may be used for realizing the exemplary embodiment within the scope of the exemplary embodiment.

The various display control programs to be executed in the game apparatus 10 of the exemplary embodiment may be supplied to the game apparatus 10 not only via a storage medium such as the external memory 44 but also via a wired or wireless communication line. Further, the display control programs may be previously stored in a non-volatile storage device (e.g. the internal data storage memory 35) provided in the game apparatus 10. Examples of the information storage medium having the display control programs stored therein include a CD-ROM, a DVD, any other optical disc-shaped storage medium similar to those, a flexible disk, a hard disk, a magnetic optical disk, a magnetic tape, and the like, in addition to a non-volatile memory. Further, the information storage medium having the display control programs stored therein may be a volatile memory that temporarily stores the display control programs.

The exemplary embodiment is applicable to storage media having stored therein a display control program to be executed by a computer of a display control apparatus which performs stereoscopic display, display control apparatuses, display control systems, display control methods, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a display control program to be executed by a computer of a display control apparatus which stereoscopically displays a predetermined two-dimensional object and a predetermined three-dimensional object positioned in a virtual three-dimensional space on a display device, the display control program causing the computer to execute:
    obtaining a depth value in accordance with a state of the virtual three-dimensional space captured by a virtual stereo camera;
    synthesizing an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and rendering the respective synthesized images, thereby generating a stereoscopic image;
    stereoscopically displaying the generated stereoscopic image on the display device,
    obtaining the depth value repeatedly;
    re-setting the shift amount each time the depth value is obtained;
    synthesizing the image for left eye and the image for right eye, which are obtained by shifting the two-dimensional object by the re-set shift amount, with the image for left eye and the image for right eye which are obtained by capturing the three-dimensional object, respectively, and rendering the respective synthesized images, thereby regenerating the stereoscopic image; and
    replacing the stereoscopic image stereoscopically displayed on the display device with the regenerated stereoscopic image.

2. The non-transitory computer-readable storage medium having stored therein the display control program according to claim 1, the program further causing the computer to execute setting a parameter, other than the depth value, relating to display of the predetermined two-dimensional object.

3. The non-transitory computer-readable storage medium having stored therein the display control program according to claim 2, wherein
    the parameter is a parameter representing a size of the predetermined two-dimensional object.

4. The non-transitory computer-readable storage medium having stored therein the display control program according to claim 3, wherein
    the parameter representing the size of the predetermined two-dimensional object is maintained constant.

5. The non-transitory computer-readable storage medium having stored therein the display control program according to claim 2, wherein
    a parameter representing a display area of the predetermined two-dimensional object is set based on a display position of the predetermined three-dimensional object in a two-dimensional coordinate system on a screen of the display device.

6. The non-transitory computer-readable storage medium having stored therein the display control program according to claim 5, wherein,
when it is assumed that a virtual screen having a size corresponding to the screen of the display device is positioned between the virtual stereo camera and the predetermined three-dimensional object, the display area of the predetermined two-dimensional object is determined based on two-dimensional coordinates, on a plane including the virtual screen, at which a line segment that connects a viewpoint position of the virtual stereo camera and the predetermined three-dimensional object intersects with the plane.

7. The non-transitory computer-readable storage medium having stored therein the display control program according to claim 6, wherein
a camera-to-camera distance that is a distance between two virtual cameras which configure the virtual stereo camera is changed in accordance with an operation on the display control apparatus, and
a parameter representing a display area of the predetermined two-dimensional object is updated in accordance with the change in the camera-to-camera distance.

8. The non-transitory computer-readable storage medium having stored therein the display control program according to claim 1, wherein
a depth value is obtained in accordance with a distance between a viewpoint position of the virtual stereo camera and the predetermined three-dimensional object in the virtual three-dimensional space.

9. The non-transitory computer-readable storage medium having stored therein the display control program according to claim 1, the program further causing the computer to execute
associating the obtained depth value with the predetermined two-dimensional object, wherein
the stereoscopic image is generated by using the associated depth value.

10. The non-transitory computer-readable storage medium having stored therein the display control program according to claim 9, wherein
images are synthesized while the depth value associated with the predetermined two-dimensional object is compared with the depth value of the predetermined three-dimensional object, by using a Z buffer.

11. The non-transitory computer-readable storage medium having stored therein the display control program according to claim 10, wherein
when a Z value of a target object to be rendered is smaller than the Z value of the two-dimensional object or the Z value of the three-dimensional object which are stored in the Z buffer, the target object is rendered.

12. The non-transitory computer-readable storage medium having stored therein the display control program according to claim 1, wherein
the predetermined two-dimensional object is a taken image representing a human face captured by an imaging section.

13. The non-transitory computer-readable storage medium having stored therein the display control program according to claim 1, wherein
the predetermined two-dimensional object is a taken image obtained by an imaging section in real time.

14. The non-transitory computer-readable storage medium having stored therein the display control program according to claim 1, wherein
the predetermined two-dimensional object is obtained by the display control apparatus communicating with an external apparatus.

15. The non-transitory computer-readable storage medium having stored therein the display control program according to claim 1, wherein
the depth value represents the distance between a predetermined reference position and the predetermined three-dimensional object in the virtual three-dimensional space in the imaging direction.

16. A display control apparatus which stereoscopically displays a predetermined two-dimensional object and a predetermined three-dimensional object positioned in a virtual three-dimensional space on a display device, the display control apparatus comprising a computer configured to:
obtain a depth value in accordance with a state of the virtual three-dimensional space captured by a virtual stereo camera;
synthesize an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and renders the respective synthesized images, thereby generating a stereoscopic image;
stereoscopically display the generated stereoscopic image on the display device,
obtain the depth value repeatedly;
re-set the shift amount each time the depth value is obtained;
synthesize the image for left eye and the image for right eye, which are obtained by shifting the two-dimensional object by the re-set shift amount, with the image for left eye and the image for right eye which are obtained by capturing the three-dimensional object, respectively, and render the respective synthesized images, thereby regenerating the stereoscopic image; and
replace the stereoscopic image stereoscopically displayed on the display device with the regenerated stereoscopic image.

17. The display control apparatus according to claim 16, wherein
the depth value represents the distance between a predetermined reference position and the predetermined three-dimensional object in the virtual three-dimensional space in the imaging direction.

18. A display control system which stereoscopically displays a predetermined two-dimensional object and a predetermined three-dimensional object positioned in a virtual three-dimensional space on a display device, the display control system comprising a computer configured to:
obtain a depth value in accordance with a state of the virtual three-dimensional space captured by a virtual stereo camera;
synthesize an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and renders the respective synthesized images, thereby generating a stereoscopic image;

stereoscopically display the generated stereoscopic image on the display device, obtain the depth value repeatedly;

re-set the shift amount each time the depth value is obtained;

synthesize the image for left eye and the image for right eye, which are obtained by shifting the two-dimensional object by the re-set shift amount, with the image for left eye and the image for right eye which are obtained by capturing the three-dimensional object, respectively, and render the respective synthesized images, thereby regenerating the stereoscopic image; and replace the stereoscopic image stereoscopically displayed on the display device with the regenerated stereoscopic image.

19. A display control method of causing a display control apparatus to execute stereoscopically displaying a predetermined two-dimensional object and a predetermined three-dimensional object positioned in a virtual three-dimensional space on a display device, the method comprising:

obtaining a depth value in accordance with a state of the virtual three-dimensional space captured by a virtual stereo camera;

synthesizing an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and rendering the respective synthesized images, thereby generating a stereoscopic image;

stereoscopically displaying the generated stereoscopic image on the display device, obtaining the depth value repeatedly;

re-setting the shift amount each time the depth value is obtained;

synthesizing the image for left eye and the image for right eye, which are obtained by shifting the two-dimensional object by the re-set shift amount, with the image for left eye and the image for right eye which are obtained by capturing the three-dimensional object, respectively, and rendering the respective synthesized images, thereby regenerating the stereoscopic image; and replacing the stereoscopic image stereoscopically displayed on the display device with the regenerated stereoscopic image.

20. The display control method according to claim 19, wherein the depth value represents the distance between a predetermined reference position and the predetermined three-dimensional object in the virtual three-dimensional space in the imaging direction.

21. A non-transitory computer-readable storage medium having stored therein a display control program to be executed by a computer of a display control apparatus which stereoscopically displays a predetermined two-dimensional object and a predetermined three-dimensional object positioned in a virtual three-dimensional space on a display device, the display control program causing the computer to execute:

obtaining a depth value in accordance with a state of the virtual three-dimensional space captured by a virtual stereo camera;

synthesizing an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and rendering the respective synthesized images, thereby generating a stereoscopic image;

stereoscopically displaying the generated stereoscopic image on the display device; and changing a position of the predetermined two-dimensional object in accordance with a movement of the predetermined three-dimensional object.

22. A non-transitory computer-readable storage medium having stored therein a display control program to be executed by a computer of a display control apparatus which stereoscopically displays a predetermined two-dimensional object and a predetermined three-dimensional object positioned in a virtual three-dimensional space on a display device, the display control program causing the computer to execute:

obtaining a depth value in accordance with a state of the virtual three-dimensional space captured by a virtual stereo camera;

synthesizing an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and rendering the respective synthesized images, thereby generating a stereoscopic image; and stereoscopically displaying the generated stereoscopic image on the display device, wherein the shift amount depends on a distance between the virtual stereo camera and the predetermined three-dimensional object in the virtual three-dimensional space and the distance between the virtual stereo camera and a zero-parallax surface in the three-dimensional space.

23. A non-transitory computer-readable storage medium having stored therein a display control program to be executed by a computer of a display control apparatus which stereoscopically displays a predetermined two-dimensional object and a predetermined three-dimensional object positioned in a virtual three-dimensional space on a display device, the display control program causing the computer to execute:

obtaining a depth value in accordance with a state of the virtual three-dimensional space captured by a virtual stereo camera;

synthesizing an image for left eye and an image for right eye which are obtained by shifting the two-dimensional object, in order to generate parallax, by a shift amount in accordance with the obtained depth value, with an image for left eye and an image for right eye which are obtained by capturing the predetermined three-dimensional object by the virtual stereo camera, respectively, and rendering the respective synthesized images, thereby generating a stereoscopic image; and stereoscopically displaying the generated stereoscopic image on the display device, wherein the shift amount is in accordance with the depth value which the three-dimensional object has, thereby the two-dimensional object is stereoscopically displayed at substantially the same depth position as the three-dimensional object.

\* \* \* \* \*